US012693770B2

(12) United States Patent
Hwang et al.

(10) Patent No.: US 12,693,770 B2
(45) Date of Patent: Jul. 28, 2026

(54) EXTENDED REALITY HAND-LOCATED USER INTERFACES

(71) Applicant: Snap Inc., Santa Monica, CA (US)

(72) Inventors: Viktoria Hwang, Monrovia, CA (US);
James Powderly, Venice, CA (US);
Evan Spiegel, Los Angeles, CA (US);
Karen Stolzenberg, Venice, CA (US);
Mathieu Emmanuel Vignau, Los
Angeles, CA (US)

(73) Assignee: Snap Inc., Santa Monica, CA (US)

( * ) Notice: Subject to any disclaimer, the term of this
patent is extended or adjusted under 35
U.S.C. 154(b) by 0 days.

(21) Appl. No.: 18/825,800

(22) Filed: Sep. 5, 2024

(65) Prior Publication Data

US 2026/0064237 A1    Mar. 5, 2026

(51) Int. Cl.
*G06F 3/01*        (2006.01)
*G06F 3/04815*      (2022.01)

(52) U.S. Cl.
CPC .......... *G06F 3/04815* (2013.01); *G06F 3/011*
(2013.01); *G06F 3/017* (2013.01)

(58) Field of Classification Search
CPC ....... G06F 3/011; G06F 3/04815; G06F 3/017
See application file for complete search history.

(56) References Cited

U.S. PATENT DOCUMENTS

| | | | |
|---|---|---|---|
| 7,971,156 | B2 | 6/2011 | Albertson et al. |
| 9,225,897 | B1 | 12/2015 | Sehn et al. |
| 9,276,886 | B1 | 3/2016 | Samaranayake |
| 9,705,831 | B2 | 7/2017 | Spiegel |
| 9,742,713 | B2 | 8/2017 | Spiegel et al. |
| 10,102,423 | B2 | 10/2018 | Shaburov et al. |
| 10,284,508 | B1 | 5/2019 | Allen et al. |

(Continued)

FOREIGN PATENT DOCUMENTS

| | | |
|---|---|---|
| EP | 3707693 A1 | 9/2020 |
| EP | 4172726 A1 | 5/2023 |

(Continued)

OTHER PUBLICATIONS

"International Application Serial No. PCT US2025 042001, International Search Report mailed Nov. 7, 2025", 3 pgs.

(Continued)

*Primary Examiner* — Adam R. Giesy

(74) *Attorney, Agent, or Firm* — Schwegman Lundberg &
Woessner, P.A.

(57)                ABSTRACT

An eXtended Reality (XR) system that provides a hand-located XR user interface to a user. The XR system captures tracking data of a user's hands using one or more sensors. The XR system uses the tracking data to generate the hand-located XR user interface that includes one or more interactive virtual objects associated with one or more locations on a surface of the first hand of the user which the user can interact with using a digit of a second hand. Upon detecting a hand touch of the surface of the first hand by a digit of the second hand, the XR system executes a function or process associated with an interactive virtual object associated with the location of the hand touch. The hand-located XR user interface can be provided within or outside of a field of view of an optical element that provides images of the interactive virtual objects.

18 Claims, 19 Drawing Sheets

(56) References Cited

U.S. PATENT DOCUMENTS

| | | | |
|---|---|---|---|
| 10,439,972 B1 | 10/2019 | Spiegel et al. | |
| 10,509,466 B1 | 12/2019 | Miller et al. | |
| 10,514,876 B2 | 12/2019 | Sehn | |
| 10,579,869 B1 | 3/2020 | Xiong et al. | |
| 10,591,730 B2 | 3/2020 | Rodriguez, II et al. | |
| 10,614,855 B2 | 4/2020 | Huang | |
| 10,748,347 B1 | 8/2020 | Li et al. | |
| 10,958,608 B1 | 3/2021 | Allen et al. | |
| 10,962,809 B1 | 3/2021 | Castañeda | |
| 10,996,846 B2 | 5/2021 | Robertson et al. | |
| 10,997,787 B2 | 5/2021 | Ge et al. | |
| 11,012,390 B1 | 5/2021 | Al Majid et al. | |
| 11,030,454 B1 | 6/2021 | Xiong et al. | |
| 11,036,368 B1 | 6/2021 | Al Majid et al. | |
| 11,062,498 B1 | 7/2021 | Voss et al. | |
| 11,087,728 B1 | 8/2021 | Canberk et al. | |
| 11,092,998 B1 | 8/2021 | Castañeda et al. | |
| 11,106,342 B1 | 8/2021 | Al Majid et al. | |
| 11,126,206 B2 | 9/2021 | Meisenholder et al. | |
| 11,143,867 B2 | 10/2021 | Rodriguez, II | |
| 11,169,600 B1 | 11/2021 | Canberk et al. | |
| 11,227,626 B1 | 1/2022 | Krishnan Gorumkonda et al. | |
| 11,307,747 B2 | 4/2022 | Dancie et al. | |
| 11,531,402 B1 | 12/2022 | Stolzenberg | |
| 11,546,505 B2 | 1/2023 | Canberk | |
| 11,798,201 B2 | 10/2023 | Eirinberg et al. | |
| 2012/0113223 A1 | 5/2012 | Hilliges et al. | |
| 2016/0224123 A1* | 8/2016 | Antoniac | G06F 3/04815 |
| 2019/0146219 A1 | 5/2019 | Rodriguez, II | |
| 2019/0391662 A1 | 12/2019 | Yokokawa | |
| 2021/0011612 A1 | 1/2021 | Dancie et al. | |
| 2021/0074016 A1 | 3/2021 | Li et al. | |
| 2021/0166732 A1 | 6/2021 | Shaburova et al. | |
| 2021/0174034 A1 | 6/2021 | Retek et al. | |
| 2021/0241529 A1 | 8/2021 | Cowburn et al. | |
| 2021/0303075 A1 | 9/2021 | Cowburn et al. | |
| 2021/0303077 A1 | 9/2021 | Anvaripour et al. | |
| 2021/0303140 A1 | 9/2021 | Mourkogiannis | |
| 2021/0382564 A1 | 12/2021 | Blachly et al. | |
| 2021/0397000 A1 | 12/2021 | Rodriguez, II | |
| 2021/0405761 A1 | 12/2021 | Canberk | |
| 2022/0188539 A1 | 6/2022 | Chan et al. | |
| 2022/0206588 A1 | 6/2022 | Canberk et al. | |
| 2022/0300730 A1 | 9/2022 | Eirinberg et al. | |
| 2022/0300731 A1 | 9/2022 | Eirinberg et al. | |
| 2022/0301231 A1 | 9/2022 | Eirinberg et al. | |
| 2022/0326781 A1 | 10/2022 | Hwang et al. | |
| 2022/0334649 A1 | 10/2022 | Hwang et al. | |
| 2022/0375174 A1 | 11/2022 | Arya et al. | |
| 2023/0031913 A1* | 2/2023 | Ishikawa | G06T 19/006 |
| 2023/0117197 A1 | 4/2023 | Stolzenberg | |

FOREIGN PATENT DOCUMENTS

| | | | |
|---|---|---|---|
| EP | 4172730 A1 | 5/2023 | |
| KR | 20220158824 A | 12/2022 | |
| WO | 2019094618 A1 | 5/2019 | |
| WO | 2022005687 A1 | 1/2022 | |
| WO | 2022005693 A1 | 1/2022 | |
| WO | 2022060549 A3 | 3/2022 | |
| WO | 2022066578 A1 | 3/2022 | |
| WO | 2022060549 A2 | 4/2022 | |
| WO | 2022132381 A1 | 6/2022 | |
| WO | 2022146678 A1 | 7/2022 | |
| WO | 2022198182 A1 | 9/2022 | |
| WO | 2022216784 A1 | 10/2022 | |
| WO | 2022225761 A1 | 10/2022 | |
| WO | 2022245765 A1 | 11/2022 | |

OTHER PUBLICATIONS

"International Application Serial No. PCT US2025 042001, Written Opinion mailed Nov. 7, 2025", 7 pgs.

* cited by examiner

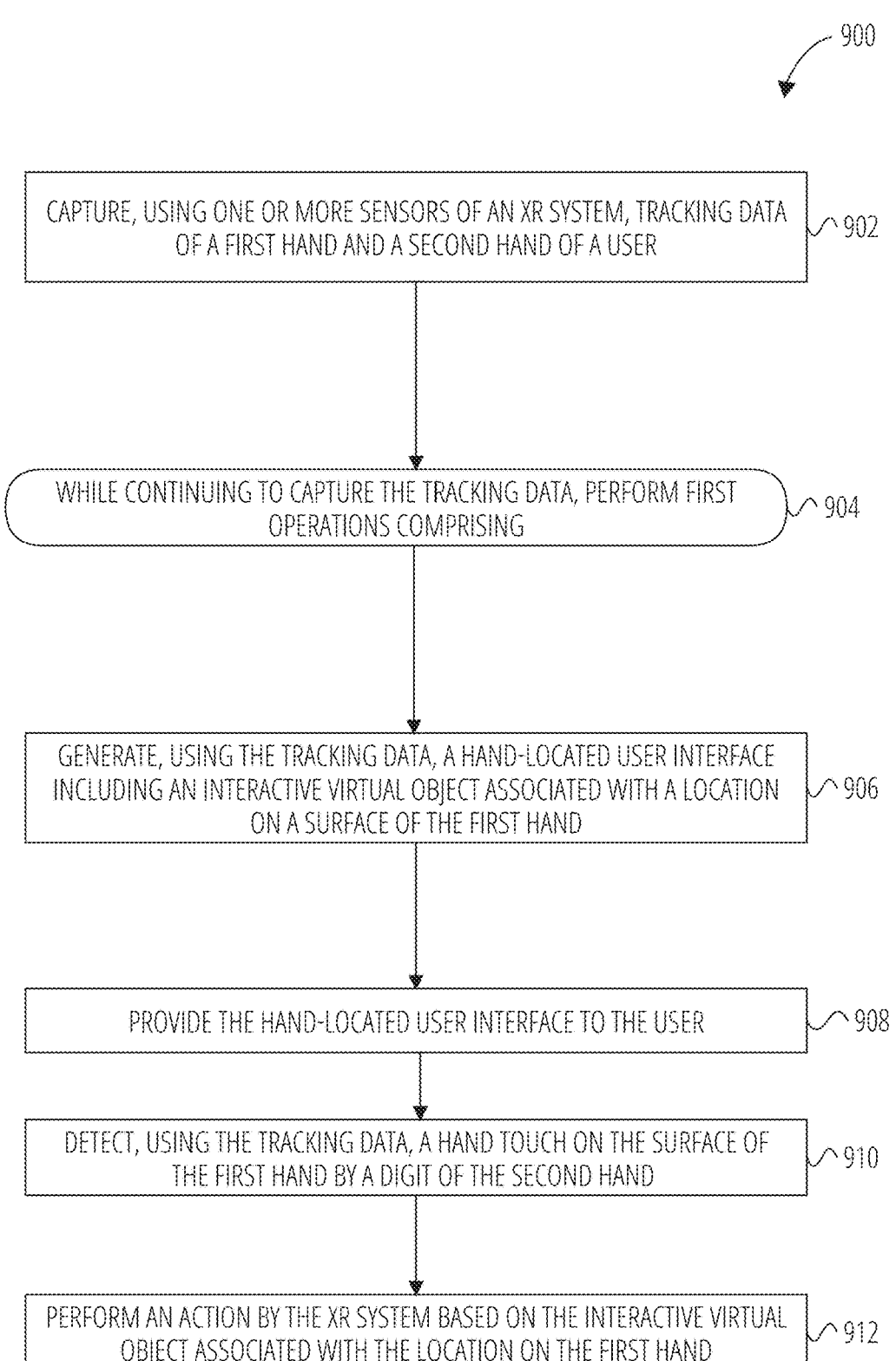

900

CAPTURE, USING ONE OR MORE SENSORS OF AN XR SYSTEM, TRACKING DATA OF A FIRST HAND AND A SECOND HAND OF A USER ⌇ 902

WHILE CONTINUING TO CAPTURE THE TRACKING DATA, PERFORM FIRST OPERATIONS COMPRISING ⌇ 904

GENERATE, USING THE TRACKING DATA, A HAND-LOCATED USER INTERFACE INCLUDING AN INTERACTIVE VIRTUAL OBJECT ASSOCIATED WITH A LOCATION ON A SURFACE OF THE FIRST HAND ⌇ 906

PROVIDE THE HAND-LOCATED USER INTERFACE TO THE USER ⌇ 908

DETECT, USING THE TRACKING DATA, A HAND TOUCH ON THE SURFACE OF THE FIRST HAND BY A DIGIT OF THE SECOND HAND ⌇ 910

PERFORM AN ACTION BY THE XR SYSTEM BASED ON THE INTERACTIVE VIRTUAL OBJECT ASSOCIATED WITH THE LOCATION ON THE FIRST HAND ⌇ 912

FIG. 9A

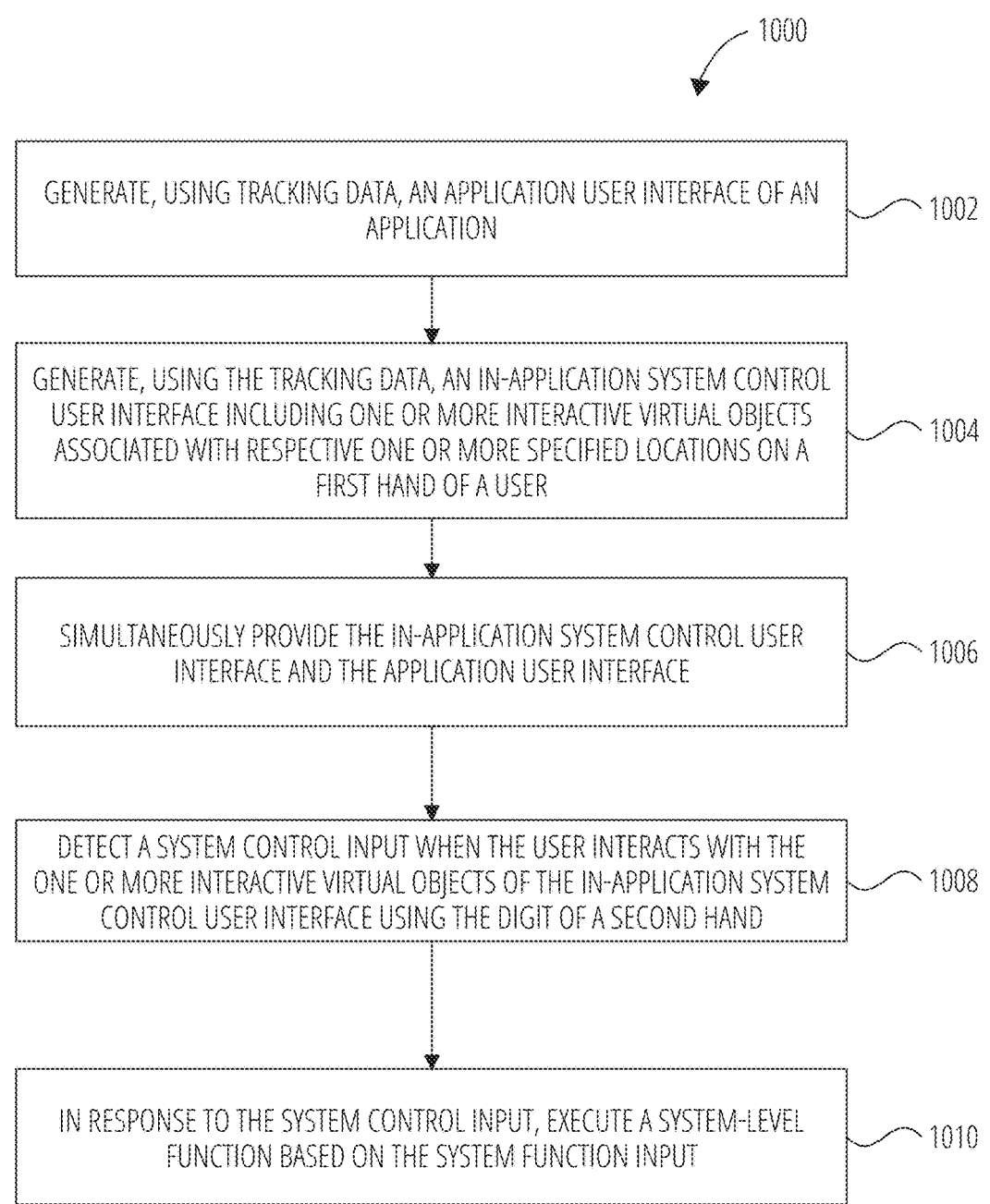

1000

GENERATE, USING TRACKING DATA, AN APPLICATION USER INTERFACE OF AN APPLICATION ~ 1002

GENERATE, USING THE TRACKING DATA, AN IN-APPLICATION SYSTEM CONTROL USER INTERFACE INCLUDING ONE OR MORE INTERACTIVE VIRTUAL OBJECTS ASSOCIATED WITH RESPECTIVE ONE OR MORE SPECIFIED LOCATIONS ON A FIRST HAND OF A USER ~ 1004

SIMULTANEOUSLY PROVIDE THE IN-APPLICATION SYSTEM CONTROL USER INTERFACE AND THE APPLICATION USER INTERFACE ~ 1006

DETECT A SYSTEM CONTROL INPUT WHEN THE USER INTERACTS WITH THE ONE OR MORE INTERACTIVE VIRTUAL OBJECTS OF THE IN-APPLICATION SYSTEM CONTROL USER INTERFACE USING THE DIGIT OF A SECOND HAND ~ 1008

IN RESPONSE TO THE SYSTEM CONTROL INPUT, EXECUTE A SYSTEM-LEVEL FUNCTION BASED ON THE SYSTEM FUNCTION INPUT ~ 1010

EXTENDED REALITY HAND-LOCATED USER INTERFACES

TECHNICAL FIELD

The present disclosure relates generally to user interfaces and, more particularly, to user interfaces used for extended reality.

BACKGROUND

A head-wearable apparatus can be implemented with a transparent or semi-transparent display through which a user of the head-wearable apparatus can view the surrounding environment. Such head-wearable apparatuses enable a user to see through the transparent or semi-transparent display to view the surrounding environment, and to also see objects (e.g., objects such as a rendering of a 2D or 3D graphic model, images, video, text, and so forth) that are generated for display to appear as a part of, and/or overlaid upon, the surrounding environment. This is typically referred to as "augmented reality" or "AR." A head-wearable apparatus can additionally completely occlude a user's visual field and display a virtual environment through which a user can move or be moved. This is typically referred to as "virtual reality" or "VR." In a hybrid form, a view of the surrounding environment is captured using cameras, and then that view is provided along with augmentation to the user on displays that occlude the user's eyes. As used herein, the term eXtended Reality (XR) refers to augmented reality, virtual reality and any of hybrids of these technologies unless the context indicates otherwise.

A user of the head-wearable apparatus can access and use a computer software application to perform various tasks or engage in an activity. To use the computer software application, the user interacts with a user interface provided by the head-wearable apparatus.

BRIEF DESCRIPTION OF THE SEVERAL VIEWS OF THE DRAWINGS

In the drawings, which are not necessarily drawn to scale, like numerals can describe similar components in different views. To easily identify the discussion of any particular element or act, the most significant digit or digits in a reference number refer to the figure number in which that element is first introduced. Some non-limiting examples are illustrated in the figures of the accompanying drawings in which:

FIG. 9A illustrates a system control user interface method, according to some examples.

FIG. 10A illustrates an in-application system control user interface method, according to some examples.

FIG. 13 is a block diagram showing a software architecture, according to some examples.

DETAILED DESCRIPTION

Figure 1A:
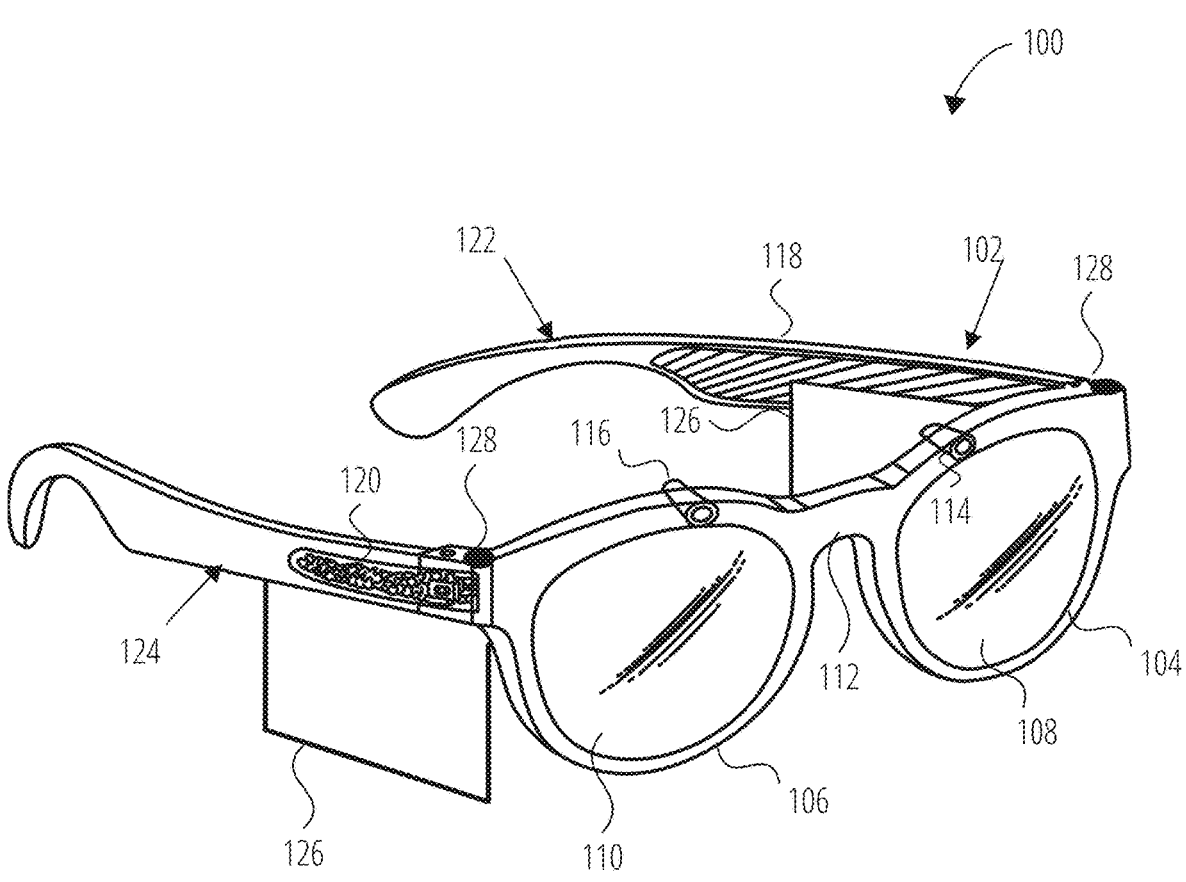
FIG. 1A is a perspective view of a head-wearable apparatus, according to some examples.

Extended Reality (XR) systems have revolutionized the way users interact with digital content, merging the real and virtual worlds to create immersive experiences. However, traditional interaction methods, such as physical controllers or imprecise gesture recognition technologies, often disrupt the seamless integration of real and virtual elements, leading to a less intuitive and sometimes cumbersome user experience. This is particularly problematic in environments where users need to interact with digital content while still being aware of and interacting with their physical surroundings. Additionally, the reliance on visual cues for interaction can be challenging in dynamic environments where users' visual attention is divided, potentially leading to increased cognitive load and reduced efficiency in task execution.

The methodologies described in this disclosure address these challenges using a user interface integrated directly onto the user's palm or back of the hand. This approach leverages the natural proprioceptive abilities of users—their innate sense of the position and movement of their body parts—to facilitate intuitive interactions without the need for visual confirmation. By using the palm or back of the hand as a consistent, always accessible control surface, the system significantly reduces the cognitive load associated with traditional XR interfaces. Furthermore, the ergonomic placement of interactive elements on the palm or back of the hand considers natural hand movements and accessibility, enhancing comfort and reducing the likelihood of accidental activations that can occur with handheld controllers or gesture-based systems. This hand-located interface not only simplifies the interaction within XR environments but also ensures that users can operate the system efficiently, even when their visual focus is required elsewhere.

In some examples, an XR system captures, using one or more sensors, tracking data of a first hand and a second hand of a user. The XR system continues to capture the tracking data and performs operations that include generating, using the tracking data, a hand-located user interface. This interface includes an interactive virtual object associated with a location on the surface of the first hand. The XR system provides this hand-located user interface to the user. Additionally, the XR system detects, using the tracking data, a hand touch on the surface of the first hand by a digit of the second hand. Following this detection, the XR system performs an action based on the interactive virtual object associated with the location on the first hand.

In some examples, the surface of the first hand is a palmar surface.

In some examples, the location is a thenar eminence of the first hand.

In some examples, the location is a hypothenar eminence of the first hand.

In some examples, the location is an interdigital space of the first hand.

In some examples, the surface of the first hand is a hand dorsal surface.

In some examples, the XR user interface is provided to the user outside of an optical element field of view of one or more optical elements of the XR system.

Other technical features can be readily apparent to one skilled in the art from the following figures, descriptions, and claims.

FIG. 1A is a perspective view of a head-wearable apparatus 100 according to some examples. The head-wearable apparatus 100 can be a client device of an XR system, such as a user system 302 of FIG. 3. The head-wearable apparatus 100 can include a frame 102 made from any suitable material such as plastic or metal, including any suitable shape memory alloy. In one or more examples, the frame 102 includes a first or left optical element holder 104 (e.g., a display or lens holder) and a second or right optical element holder 106 connected by a bridge 112. A first or left optical element 108 and a second or right optical element 110 can be provided within respective left optical element holder 104 and right optical element holder 106. The right optical element 110 and the left optical element 108 can be a lens, a display, a display assembly, or a combination of the foregoing. Any suitable display assembly can be provided in the head-wearable apparatus 100.

The frame 102 additionally includes a left arm or left temple piece 122 and a right arm or right temple piece 124. In some examples, the frame 102 can be formed from a single piece of material so as to have a unitary or integral construction.

The head-wearable apparatus 100 can include a computing device, such as a computer 120, which can be of any suitable type so as to be carried by the frame 102 and, in one or more examples, of a suitable size and shape, so as to be partially disposed in one of the left temple piece 122 or the right temple piece 124. The computer 120 can include one or more processors with memory, wireless communication circuitry, and a power source. As discussed below, the computer 120 comprises low-power circuitry 224, high-speed circuitry 226, and a display processor. Various other examples can include these elements in different configurations or integrated together in different ways. Additional details of aspects of the computer 120 can be implemented as illustrated by the machine 400 discussed herein.

The computer 120 additionally includes a battery 118 or other suitable portable power supply. In some examples, the battery 118 is disposed in left temple piece 122 and is electrically coupled to the computer 120 disposed in the right temple piece 124. The head-wearable apparatus 100 can include a connector or port (not shown) suitable for charging the battery 118, a wireless receiver, transmitter or transceiver (not shown), or a combination of such devices.

The head-wearable apparatus 100 includes a first or left camera 114 and a second or right camera 116. Although two cameras are depicted, other examples contemplate the use of a single or additional cameras (e.g., two or more cameras).

In some examples, the head-wearable apparatus 100 includes any number of input sensors or other input/output devices in addition to the left camera 114 and the right camera 116. Such sensors or input/output devices can additionally include biometric sensors, location sensors, motion sensors, and so forth.

In some examples, the left camera 114 and the right camera 116 provide tracking image data for use by the head-wearable apparatus 100 to extract 3D information from a real-world environment.

The head-wearable apparatus 100 can also include a touchpad 126 mounted to or integrated with one or both of the left temple piece 122 and right temple piece 124. The touchpad 126 is generally vertically-arranged, approximately parallel to a user's temple in some examples. As used herein, generally vertically aligned means that the touchpad is more vertical than horizontal, although potentially more vertical than that. Additional user input can be provided by one or more buttons 128, which in the illustrated examples are provided on the outer upper edges of the left optical element holder 104 and right optical element holder 106. The one or more touchpads 126 and buttons 128 provide a means whereby the head-wearable apparatus 100 can receive input from a user of the head-wearable apparatus 100.

Figure 1B:
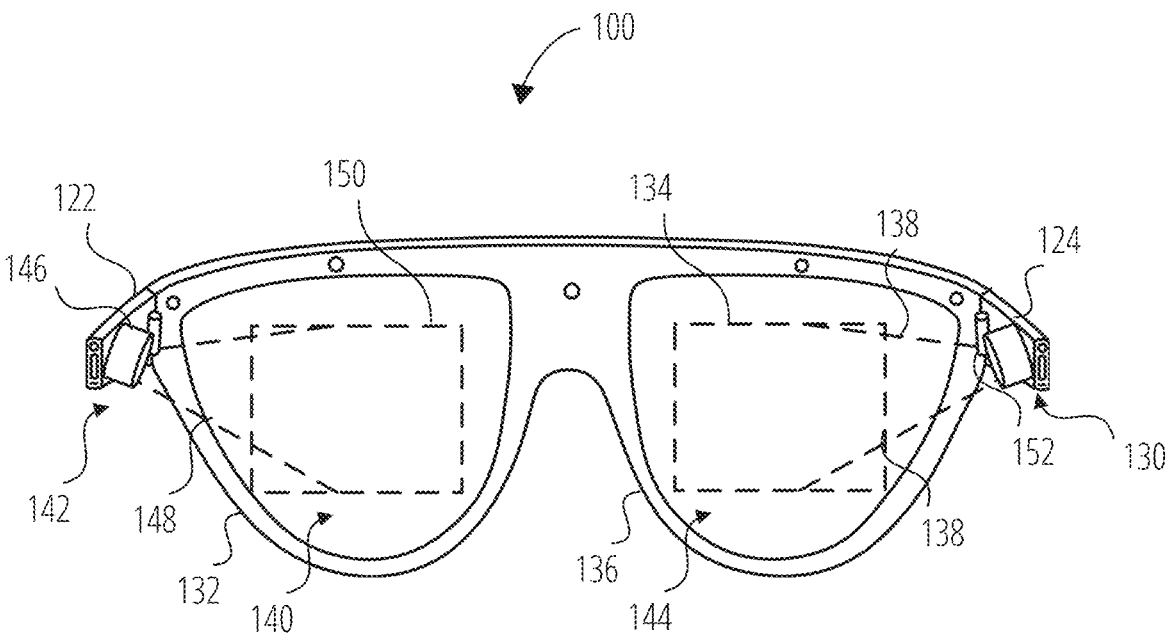
FIG. 1B illustrates a further view of the head-wearable apparatus of FIG. 1A, according to some examples.

FIG. 1B illustrates the head-wearable apparatus 100 from the perspective of a user while wearing the head-wearable apparatus 100. For clarity, a number of the elements shown in FIG. 1A have been omitted. As described in FIG. 1A, the head-wearable apparatus 100 shown in FIG. 1B includes left optical element 140 and right optical element 144 secured within the left optical element holder 132 and the right optical element holder 136 respectively.

The head-wearable apparatus 100 includes right forward optical assembly 130 comprising a left near eye display 150, a right near eye display 134, and a left forward optical assembly 142 including a left projector 146 and a right projector 152.

In some examples, the near eye displays are waveguides. The waveguides include reflective or diffractive structures (e.g., gratings and/or optical elements such as mirrors, lenses, or prisms). Light 138 emitted by the right projector 152 encounters the diffractive structures of the waveguide of the right near eye display 134, which directs the light towards the right eye of a user to provide an image on or in the right optical element 144 that overlays the view of the real-world environment seen by the user. Similarly, light 148 emitted by the left projector 146 encounters the diffractive structures of the waveguide of the left near eye display 150, which directs the light towards the left eye of a user to provide an image on or in the left optical element 140 that overlays the view of the real-world environment seen by the user. The combination of a Graphical Processing Unit, an image display driver, the right forward optical assembly 130, the left forward optical assembly 142, left optical element 140, and the right optical element 144 provide an optical engine of the head-wearable apparatus 100. The head-wearable apparatus 100 uses the optical engine to generate an overlay of the real-world environment view of the user including display of a user interface to the user of the head-wearable apparatus 100.

It will be appreciated however that other display technologies or configurations can be utilized within an optical engine to display an image to a user in the user's field of view. For example, instead of a projector and a waveguide, an LCD, LED or other display panel or surface can be provided.

In use, a user of the head-wearable apparatus 100 will be presented with information, content and various user interfaces on the near eye displays. As described in more detail herein, the user can then interact with the head-wearable apparatus 100 using a touchpad 126 and/or the button 128, voice inputs or touch inputs on an associated device (e.g. mobile device 240 illustrated in FIG. 2), and/or hand movements, locations, and positions recognized by the head-wearable apparatus 100.

In some examples, an optical engine of an XR system is incorporated into a lens that is in contact with a user's eye, such as a contact lens or the like. The XR system generates images of an XR experience using the contact lens.

In some examples, the head-wearable apparatus 100 comprises an XR system. In some examples, the head-wearable apparatus 100 is a component of an XR system including additional computational components. In some examples, the head-wearable apparatus 100 is a component in an XR system comprising additional user input systems or devices.

Figure 2:
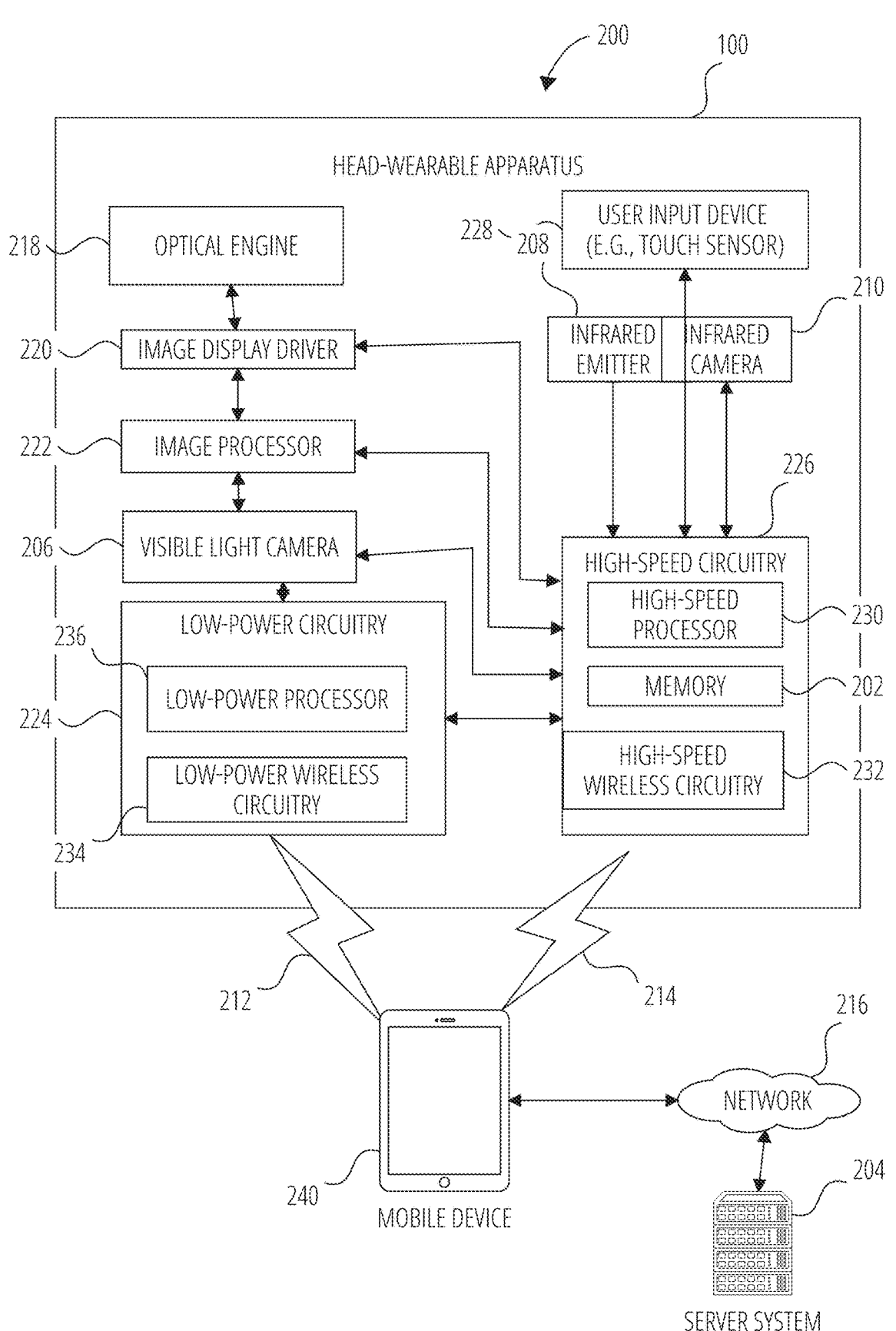
FIG. 2 illustrates a system in which the head-wearable apparatus is operably connected to a mobile device, according to some examples.

FIG. 2 illustrates a system 200 including a head-wearable apparatus 100 with a selector input device, according to some examples. FIG. 2 is a high-level functional block diagram of an example head-wearable apparatus 100 communicatively coupled to a mobile device 240 and various server systems 204 via various.

The head-wearable apparatus 100 includes one or more cameras, each of which can be, for example, a visible light camera 206, an infrared emitter 208, and an infrared camera 210.

The mobile device 240 connects with head-wearable apparatus 100 using both a low-power wireless connection 212 and a high-speed wireless connection 214. The mobile device 240 is also connected to the server system 204 and the networks 216.

The head-wearable apparatus 100 further includes one or more image displays of the optical engine 218. The optical engines 218 include one associated with the left lateral side and one associated with the right lateral side of the head-wearable apparatus 100. The head-wearable apparatus 100 also includes an image display driver 220, an image processor 222, low-power circuitry 224, and high-speed circuitry 226. The optical engine 218 is for presenting images and videos, including an image that can include a graphical user interface to a user of the head-wearable apparatus 100.

The image display driver 220 commands and controls the optical engine 218. The image display driver 220 can deliver image data directly to the optical engine 218 for presentation or can convert the image data into a signal or data format suitable for delivery to the image display device. For example, the image data can be video data formatted according to compression formats, such as H.264 (MPEG-4 Part 10), HEVC, Theora, Dirac, RealVideo RV40, VP8, VP9, or the like, and still image data can be formatted according to compression formats such as Portable Network Group (PNG), Joint Photographic Experts Group (JPEG), Tagged Image File Format (TIFF) or exchangeable image file format (EXIF) or the like.

The head-wearable apparatus 100 includes a frame and stems (or temples) extending from a lateral side of the frame. The head-wearable apparatus 100 further includes a user input device 228 (e.g., touch sensor or push button), including an input surface on the head-wearable apparatus 100. The user input device 228 (e.g., touch sensor or push button)

is to receive from the user an input selection to manipulate the graphical user interface of the presented image.

The components shown in FIG. 2 for the head-wearable apparatus 100 are located on one or more circuit boards, for example a PCB or flexible PCB, in the rims or temples. Alternatively, or additionally, the depicted components can be located in the chunks, frames, hinges, or bridge of the head-wearable apparatus 100. Left and right visible light cameras 206 can include digital camera elements such as a complementary metal oxide-semiconductor (CMOS) image sensor, charge-coupled device, camera lenses, or any other respective visible or light-capturing elements that can be used to capture data, including images of scenes with unknown objects.

The head-wearable apparatus 100 includes a memory 202, which stores instructions to perform a subset, or all the functions described herein. The memory 202 can also include storage device.

As shown in FIG. 2, the high-speed circuitry 226 includes a high-speed processor 230, a memory 202, and high-speed wireless circuitry 232. In some examples, the image display driver 220 is coupled to the high-speed circuitry 226 and operated by the high-speed processor 230 to drive the left and right image displays of the optical engine 218. The high-speed processor 230 can be any processor capable of managing high-speed communications and operation of any general computing system needed for the head-wearable apparatus 100. The high-speed processor 230 includes processing resources needed for managing high-speed data transfers on a high-speed wireless connection 214 to a wireless local area network (WLAN) using the high-speed wireless circuitry 232. In certain examples, the high-speed processor 230 executes an operating system such as a LINUX operating system or other such operating system of the head-wearable apparatus 100, and the operating system is stored in the memory 202 for execution. In addition to any other responsibilities, the high-speed processor 230 executing a software architecture for the head-wearable apparatus 100 is used to manage data transfers with high-speed wireless circuitry 232. In certain examples, the high-speed wireless circuitry 232 is configured to implement Institute of Electrical and Electronic Engineers (IEEE) 802.11 communication standards, also referred to herein as WI-FI®. In some examples, other high-speed communications standards can be implemented by the high-speed wireless circuitry 232.

The low-power wireless circuitry 234 and the high-speed wireless circuitry 232 of the head-wearable apparatus 100 can include short-range transceivers (e.g., Bluetooth™, Bluetooth LE, Zigbee, ANT+) and wireless wide, local, or wide area Network transceivers (e.g., cellular or WI-FI®). Mobile device 240, including the transceivers communicating via the low-power wireless connection 212 and the high-speed wireless connection 214, can be implemented using details of the architecture of the head-wearable apparatus 100, as can other elements of the network 216.

The memory 202 includes any storage device capable of storing various data and applications, including, among other things, camera data generated by the left and right visible light cameras 206, the infrared camera 210, and the image processor 222, as well as images generated for display by the image display driver 220 on the image displays of the optical engine 218. While the memory 202 is shown as integrated with high-speed circuitry 226, in some examples, the memory 202 can be an independent standalone element of the head-wearable apparatus 100. In certain such examples, electrical routing lines can provide a connection through a chip that includes the high-speed processor 230 from the image processor 222 or the low-power processor 236 to the memory 202. In some examples, the high-speed processor 230 can manage addressing of the memory 202 such that the low-power processor 236 will boot the high-speed processor 230 any time that a read or write operation involving memory 202 is needed.

As shown in FIG. 2, the low-power processor 236 or high-speed processor 230 of the head-wearable apparatus 100 can be coupled to the camera (visible light camera 206, infrared emitter 208, or infrared camera 210), the image display driver 220, the user input device 228 (e.g., touch sensor or push button), and the memory 202.

The head-wearable apparatus 100 is connected to a host computer. For example, the head-wearable apparatus 100 is paired with the mobile device 240 via the high-speed wireless connection 214 or connected to the server system 204 via the network 216. The server system 204 can be one or more computing devices as part of a service or network computing system, for example, that includes a processor, a memory, and network communication interface to communicate over the network 216 with the mobile device 240 and the head-wearable apparatus 100.

The mobile device 240 includes a processor and a Network communication interface coupled to the processor. The Network communication interface allows for communication over the network 216, low-power wireless connection 212, or high-speed wireless connection 214. The mobile device 240 can further store at least portions of the instructions in the memory of the mobile device 240 memory to implement the functionality described herein.

Output components of the mobile device 240 include visual components, such as a display such as a liquid crystal display (LCD), a plasma display panel (PDP), a light-emitting diode (LED) display, a projector, or a waveguide. The image displays of the optical assembly are driven by the image display driver 220. The output components of the mobile device 240 further include acoustic components (e.g., speakers), haptic components (e.g., a vibratory motor), other signal generators, and so forth. The input components of the mobile device 240, the mobile device 240, and server system 204, such as the user input device 228, can include alphanumeric input components (e.g., a keyboard, a touch screen configured to receive alphanumeric input, a photo-optical keyboard, or other alphanumeric input components), point-based input components (e.g., a mouse, a touchpad, a trackball, a joystick, a motion sensor, or other pointing instruments), tactile input components (e.g., a physical button, a touch screen that provides location and force of touches or touch gestures, or other tactile input components), audio input components (e.g., a microphone), and the like.

The head-wearable apparatus 100 can also include additional peripheral device elements. Such peripheral device elements can include sensors and display elements integrated with the head-wearable apparatus 100. For example, peripheral device elements can include any I/O components including output components, motion components, position components, or any other such elements described herein.

In some examples, the head-wearable apparatus 100 can include biometric components or sensors to detect expressions (e.g., hand expressions, facial expressions, vocal expressions, body gestures, or eye-tracking), measure biosignals (e.g., blood pressure, heart rate, body temperature, perspiration, or brain waves), identify a person (e.g., voice identification, retinal identification, facial identification, fingerprint identification, or electroencephalogram-based identification), and the like. The biometric components can include a brain-machine interface (BMI) system that allows communication between the brain and an external device or machine. This can be achieved by recording brain activity data, translating this data into a format that can be understood by a computer, and then using the resulting signals to control the device or machine.

Example types of BMI technologies, including:

Electroencephalography (EEG) based BMIs, which record electrical activity in the brain using electrodes placed on the scalp.

Invasive BMIs, which used electrodes that are surgically implanted into the brain.

Optogenetics BMIs, which use light to control the activity of specific nerve cells in the brain.

Any biometric data collected by the biometric components is captured and stored with only user approval and deleted on user request, and in accordance with applicable laws. Further, such biometric data can be used for very limited purposes, such as identification verification. To ensure limited and authorized use of biometric information and other personally identifiable information (PII), access to this data is restricted to authorized personnel only, if at all. Any use of biometric data can strictly be limited to identification verification purposes, and the biometric data is not shared or sold to any third party without the explicit consent of the user. In addition, appropriate technical and organizational measures are implemented to ensure the security and confidentiality of this sensitive information.

The motion components include acceleration sensor components (e.g., accelerometer), gravitation sensor components, rotation sensor components (e.g., gyroscope), and so forth. The position components include location sensor components to generate location coordinates (e.g., a Global Positioning System (GPS) receiver component), Wi-Fi or Bluetooth™ transceivers to generate positioning system coordinates, altitude sensor components (e.g., altimeters or barometers that detect air pressure from which altitude can be derived), orientation sensor components (e.g., magnetometers), and the like. Such positioning system coordinates can also be received over low-power wireless connections 212 and high-speed wireless connection 214 from the mobile device 240 via the low-power wireless circuitry 234 or high-speed wireless circuitry 232.

Figure 3:
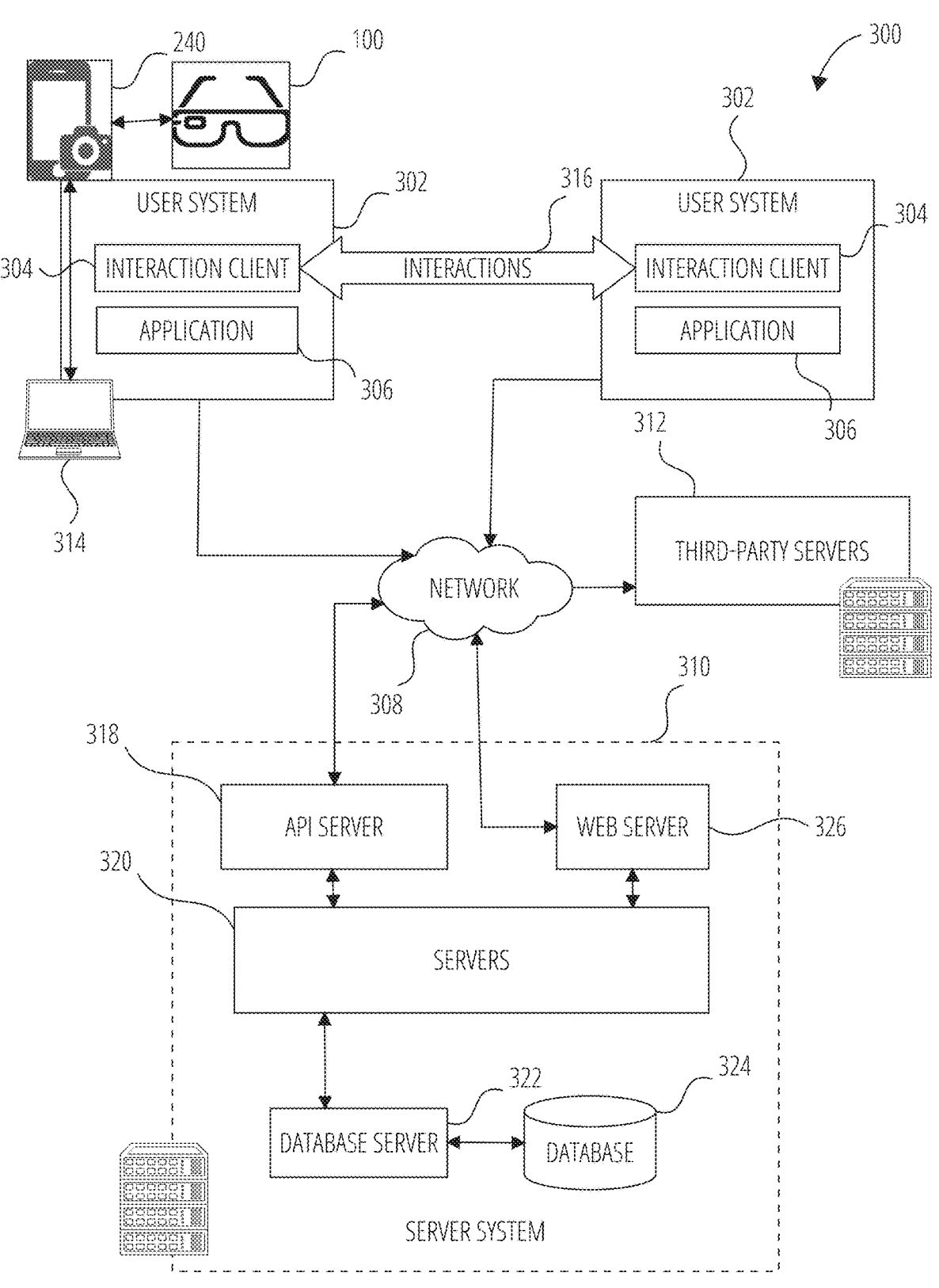
FIG. 3 illustrates a networked environment, according to some examples.

FIG. 3 is a block diagram showing an example digital interaction system 300 for facilitating interactions and engagements (e.g., exchanging text messages, conducting text audio and video calls, or playing games) over a network. The digital interaction system 300 includes multiple user systems 302, each of which hosts multiple applications, including an interaction client 304 and other applications 306. Each interaction client 304 is communicatively coupled, via one or more networks including a network 308 (e.g., the Internet), to other instances of the interaction client 304 (e.g., hosted on respective other user systems), a server system 310 and third-party servers 312). An interaction client 304 can also communicate with locally hosted applications 306 using Applications Program Interfaces (APIs).

Each user system 302 can include multiple user devices, such as a mobile device 240, head-wearable apparatus 100, and a computer client device 314 that are communicatively connected to exchange data and messages.

An interaction client 304 interacts with other interaction clients 304 and with the server system 310 via the network 308. The data exchanged between the interaction clients 304 (e.g., interactions 316) and between the interaction clients 304 and the server system 310 includes functions (e.g., commands to invoke functions) and payload data (e.g., text, audio, video, or other multimedia data).

The server system 310 provides server-side functionality via the network 308 to the interaction clients 304. While certain functions of the digital interaction system 300 are described herein as being performed by either an interaction client 304 or by the server system 310, the location of certain functionality either within the interaction client 304 or the server system 310 can be a design choice. For example, it can be technically preferable to initially deploy particular technology and functionality within the server system 310 but to later migrate this technology and functionality to the interaction client 304 where a user system 302 has sufficient processing capacity.

The server system 310 supports various services and operations that are provided to the interaction clients 304. Such operations include transmitting data to, receiving data from, and processing data generated by the interaction clients 304. This data can include message content, client device information, geolocation information, digital effects (e.g., media augmentation and overlays), message content persistence conditions, entity relationship information, and live event information. Data exchanges within the digital interaction system 300 are invoked and controlled through functions available via user interfaces (UIs) of the interaction clients 304.

Turning now specifically to the server system 310, an Application Program Interface (API) server 318 is coupled to and provides programmatic interfaces to servers 320, making the functions of the servers 320 accessible to interaction clients 304, other applications 306 and third-party server 312. The servers 320 are communicatively coupled to a database server 322, facilitating access to a database 324 that stores data associated with interactions processed by the servers 320. Similarly, a web server 326 is coupled to the servers 320 and provides web-based interfaces to the servers 320. To this end, the web server 326 processes incoming network requests over the Hypertext Transfer Protocol (HTTP) and several other related protocols.

The Application Program Interface (API) server 318 receives and transmits interaction data (e.g., commands and message payloads) between the servers 320 and the user systems 302 (and, for example, interaction clients 304 and other application 306) and the third-party server 312. Specifically, the Application Program Interface (API) server 318 provides a set of interfaces (e.g., routines and protocols) that can be called or queried by the interaction client 304 and other applications 306 to invoke functionality of the servers 320. The Application Program Interface (API) server 318 exposes various functions supported by the servers 320, including account registration; login functionality; the sending of interaction data, via the servers 320, from a particular interaction client 304 to another interaction client 304; the communication of media files (e.g., images or video) from an interaction client 304 to the servers 320; the settings of a collection of media data (e.g., a narrative); the retrieval of a list of friends of a user of a user system 302; the retrieval of messages and content; the addition and deletion of entities (e.g., friends) to an entity relationship graph; the location of friends within an entity relationship graph; and opening an application event (e.g., relating to the interaction client 304).

The interaction client 304 provides a user interface that allows users to access features and functions of an external resource, such as a linked application 306, an applet, or a microservice. This external resource can be provided by a third party or by the creator of the interaction client 304.

The external resource can be a full-scale application installed on the user's system 302, or a smaller, lightweight version of the application, such as an applet or a microservice, hosted either on the user's system or remotely, such as on third-party servers 312 or in the cloud. These smaller versions, which include a subset of the full application's features, can be implemented using a markup-language document and can also incorporate a scripting language and a style sheet.

When a user selects an option to launch or access the external resource, the interaction client 304 determines whether the resource is web-based or a locally installed application. Locally installed applications can be launched independently of the interaction client 304, while applets and microservices can be launched or accessed via the interaction client 304.

If the external resource is a locally installed application, the interaction client 304 instructs the user's system to launch the resource by executing locally stored code. If the resource is web-based, the interaction client 304 communicates with third-party servers to obtain a markup-language document corresponding to the selected resource, which it then processes to present the resource within its user interface.

The interaction client 304 can also notify users of activity in one or more external resources. For instance, it can provide notifications relating to the use of an external resource by one or more members of a user group. Users can be invited to join an active external resource or to launch a recently used but currently inactive resource.

The interaction client 304 can present a list of available external resources to a user, allowing them to launch or access a given resource. This list can be presented in a context-sensitive menu, with icons representing different applications, applets, or microservices varying based on how the menu is launched by the user.

Figure 4:
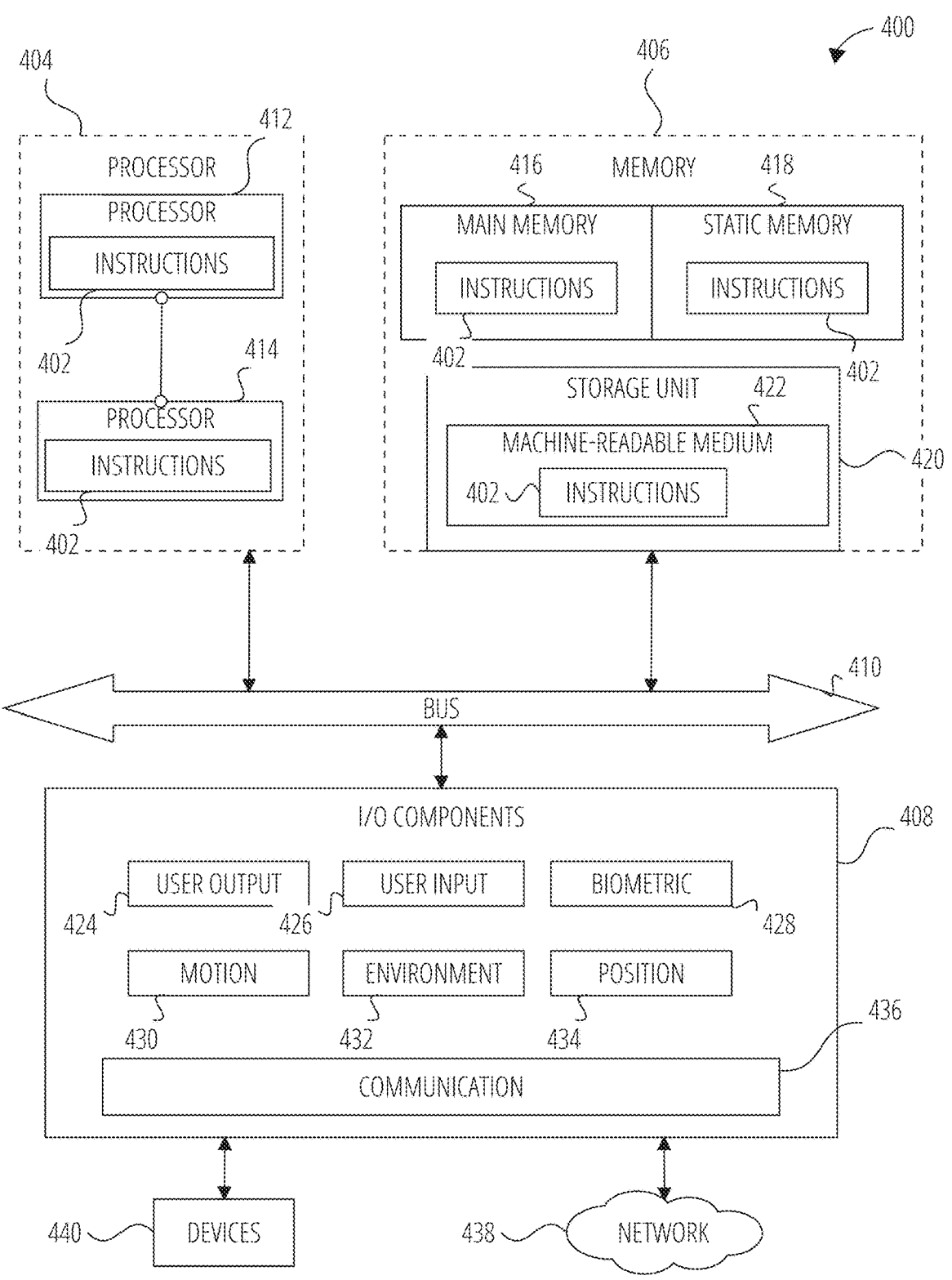
FIG. 4 is a diagrammatic representation of a machine in the form of a computer system, according to some examples.

FIG. 4 is a diagrammatic representation of the machine 400 within which instructions 402 (e.g., software, a program, an application, an applet, an app, or other executable code) for causing the machine 400 to perform any one or more of the methodologies discussed herein can be executed. For example, the instructions 402 can cause the machine 400 to execute any one or more of the methods described herein. The instructions 402 transform the general, non-programmed machine 400 into a particular machine 400 programmed to carry out the described and illustrated functions in the manner described. The machine 400 can operate as a standalone device or can be coupled (e.g., networked) to other machines. In a networked deployment, the machine 400 can operate in the capacity of a server machine or a client machine in a server-client network environment, or as a peer machine in a peer-to-peer (or distributed) network environment. The machine 400 can comprise, but not be limited to, a server computer, a client computer, a personal computer (PC), a tablet computer, a laptop computer, a netbook, a set-top box (STB), a personal digital assistant (PDA), an entertainment media system, a cellular telephone, a smartphone, a mobile device, a wearable device (e.g., a smartwatch), a smart home device (e.g., a smart appliance), other smart devices, a web appliance, a network router, a network switch, a network bridge, or any machine capable of executing the instructions 402, sequentially or otherwise, that specify actions to be taken by the machine 400. Further, while a single machine 400 is illustrated, the term "machine" shall also be taken to include a collection of machines that individually or jointly execute the instructions 402 to perform any one or more of the methodologies discussed herein. The machine 400, for example, can comprise the user system 302 or any one of multiple server devices forming part of the server system 310. In some examples, the machine 400 can also comprise both client and server systems, with certain operations of a particular method or algorithm being performed on the server-side and with certain operations of the method or algorithm being performed on the client-side.

The machine 400 can include one or more hardware processors 404, memory 406, and input/output I/O components 408, which can be configured to communicate with each other via a bus 410.

The processor 404 can comprise one or more processors such as, but not limited to, processor 412 and processor 414. The one or more processors can comprise one or more types of processing systems such as, but not limited to, Central Processing Units (CPUs), Graphics Processing Units (GPUs), Digital Signal Processors (DSPs), Neural Processing Units (NPUs) or AI Accelerators, Physics Processing Units (PPUs), Field-Programmable Gate Arrays (FPGAs), Multi-core Processors, Symmetric Multiprocessing (SMP) Systems, and the like.

The memory 406 includes a main memory 416, a static memory 418, and a storage unit 420, both accessible to the processor 404 via the bus 410. The main memory 406, the static memory 418, and storage unit 420 store the instructions 402 embodying any one or more of the methodologies or functions described herein. The instructions 402 can also reside, completely or partially, within the main memory 416, within the static memory 418, within machine-readable medium 422 within the storage unit 420, within at least one of the processor 404 (e.g., within the processor's cache memory), or any suitable combination thereof, during execution thereof by the machine 400.

The I/O components 408 can include a wide variety of components to receive input, provide output, produce output, transmit information, exchange information, capture measurements, and so on. The specific I/O components 408 that are included in a particular machine will depend on the type of machine. For example, portable machines such as mobile phones can include a touch input device or other such input mechanisms, while a headless server machine will likely not include such a touch input device. It will be appreciated that the I/O components 408 can include many other components that are not shown in FIG. 4. In various examples, the I/O components 408 can include user output components 424 and user input components 426. The user output components 424 can include visual components (e.g., a display such as a plasma display panel (PDP), a light-emitting diode (LED) display, a liquid crystal display (LCD), a projector, or a cathode ray tube (CRT)), acoustic components (e.g., speakers), haptic components (e.g., a vibratory motor, resistance mechanisms), other signal generators, and so forth. The user input components 426 can include alphanumeric input components (e.g., a keyboard, a touch screen configured to receive alphanumeric input, a photo-optical keyboard, or other alphanumeric input components), point-based input components (e.g., a mouse, a touchpad, a trackball, a joystick, a motion sensor, or another pointing instrument), tactile input components (e.g., a physical button, a touch screen that provides location and force of touches or touch gestures, or other tactile input components), audio input components (e.g., a microphone), and the like.

In further examples, the I/O components 408 can include biometric components 428, motion components 430, environmental components 432, or position components 434, among a wide array of other components. For example, the biometric components 428 include components to detect expressions (e.g., hand expressions, facial expressions, vocal expressions, body gestures, or eye-tracking), measure biosignals (e.g., blood pressure, heart rate, body temperature, perspiration, or brain waves), identify a person (e.g., voice identification, retinal identification, facial identification, fingerprint identification, or electroencephalogram-based identification), and the like. The biometric components can include a brain-machine interface (BMI) system that allows communication between the brain and an external device or machine. This can be achieved by recording brain activity data, translating this data into a format that can be understood by a computer, and then using the resulting signals to control the device or machine.

Example types of BMI technologies, including:

Electroencephalography (EEG) based BMIs, which record electrical activity in the brain using electrodes placed on the scalp.

Invasive BMIs, which used electrodes that are surgically implanted into the brain.

Optogenetics BMIs, which use light to control the activity of specific nerve cells in the brain.

Any biometric data collected by the biometric components is captured and stored only with user approval and deleted on user request, and in accordance with applicable laws. Further, such biometric data can be used for very limited purposes, such as identification verification. To ensure limited and authorized use of biometric information and other Personally Identifiable Information (PII), access to this data is restricted to authorized personnel only, if at all. Any use of biometric data can strictly be limited to identification verification purposes, and the data is not shared or sold to any third party without the explicit consent of the user. In addition, appropriate technical and organizational measures are implemented to ensure the security and confidentiality of this sensitive information.

The motion components 430 include acceleration sensor components (e.g., accelerometer), gravitation sensor components, rotation sensor components (e.g., gyroscope).

The environmental components 432 include, for example, one or cameras (with still image/photograph and video capabilities), illumination sensor components (e.g., photometer), temperature sensor components (e.g., one or more thermometers that detect ambient temperature), humidity sensor components, pressure sensor components (e.g., barometer), acoustic sensor components (e.g., one or more microphones that detect background noise), proximity sensor components (e.g., infrared sensors that detect nearby objects), gas sensors (e.g., gas detection sensors to detection concentrations of hazardous gases for safety or to measure pollutants in the atmosphere), or other components that can provide indications, measurements, or signals corresponding to a surrounding physical environment.

With respect to cameras, the user system 302 can have a camera system comprising, for example, front cameras on a front surface of the user system 302 and rear cameras on a rear surface of the user system 302. The front cameras can, for example, be used to capture still images and video of a user of the user system 302 (e.g., "selfies"), which can then be modified with digital effect data (e.g., filters) described above. The rear cameras can, for example, be used to capture still images and videos in a more traditional camera mode, with these images similarly being modified with digital effect data. In addition to front and rear cameras, the user system 302 can also include a 360° camera for capturing 360° photographs and videos.

Moreover, the camera system of the user system 302 can be equipped with advanced multi-camera configurations. This can include dual rear cameras, which might consist of a primary camera for general photography and a depth-sensing camera for capturing detailed depth information in a scene. This depth information can be used for various purposes, such as creating a bokeh effect in portrait mode, where the subject is in sharp focus while the background is blurred. In addition to dual camera setups, the user system 302 can also feature triple, quad, or even penta camera configurations on both the front and rear sides of the user system 302. These multiple cameras systems can include a wide camera, an ultra-wide camera, a telephoto camera, a macro camera, and a depth sensor, for example.

Communication can be implemented using a wide variety of technologies. The I/O components 408 further include communication components 436 operable to couple the machine 400 to a Network 438 or devices 440 via respective coupling or connections. For example, the communication components 436 can include a network interface component or another suitable device to interface with the Network 438. In further examples, the communication components 436 can include wired communication components, wireless communication components, cellular communication components, Near Field Communication (NFC) components, Bluetooth® components (e.g., Bluetooth® Low Energy), Wi-Fi® components, and other communication components to provide communication via other modalities. The devices 440 can be another machine or any of a wide variety of peripheral devices (e.g., a peripheral device coupled via a USB).

Moreover, the communication components 436 can detect identifiers or include components operable to detect identifiers. For example, the communication components 436 can include Radio Frequency Identification (RFID) tag reader components, NFC smart tag detection components, optical reader components (e.g., an optical sensor to detect one-dimensional bar codes such as Universal Product Code (UPC) bar code, multi-dimensional bar codes such as Quick Response (QR) code, Aztec code, Data Matrix, Dataglyph™, MaxiCode, PDF417, Ultra Code, UCC RSS-2D bar code, and other optical codes), or acoustic detection components (e.g., microphones to identify tagged audio signals). In addition, a variety of information can be derived via the communication components 436, such as location via Internet Protocol (IP) geolocation, location via Wi-Fi® signal triangulation, location via detecting an NFC beacon signal that can indicate a particular location, and so forth.

The various memories (e.g., main memory 416, static memory 418, and memory of the processor 404) and storage unit 420 can store one or more sets of instructions and data structures (e.g., software) embodying or used by any one or more of the methodologies or functions described herein. These instructions (e.g., the instructions 402), when executed by processor 404, cause various operations to implement the disclosed examples.

The instructions 402 can be transmitted or received over the Network 438, using a transmission medium, via a network interface device (e.g., a network interface component included in the communication components 436) and using any one of several well-known transfer protocols (e.g., hypertext transfer protocol (HTTP)). Similarly, the instructions 402 can be transmitted or received using a transmission medium via a coupling (e.g., a peer-to-peer coupling) to the devices 440.

Figure 5:
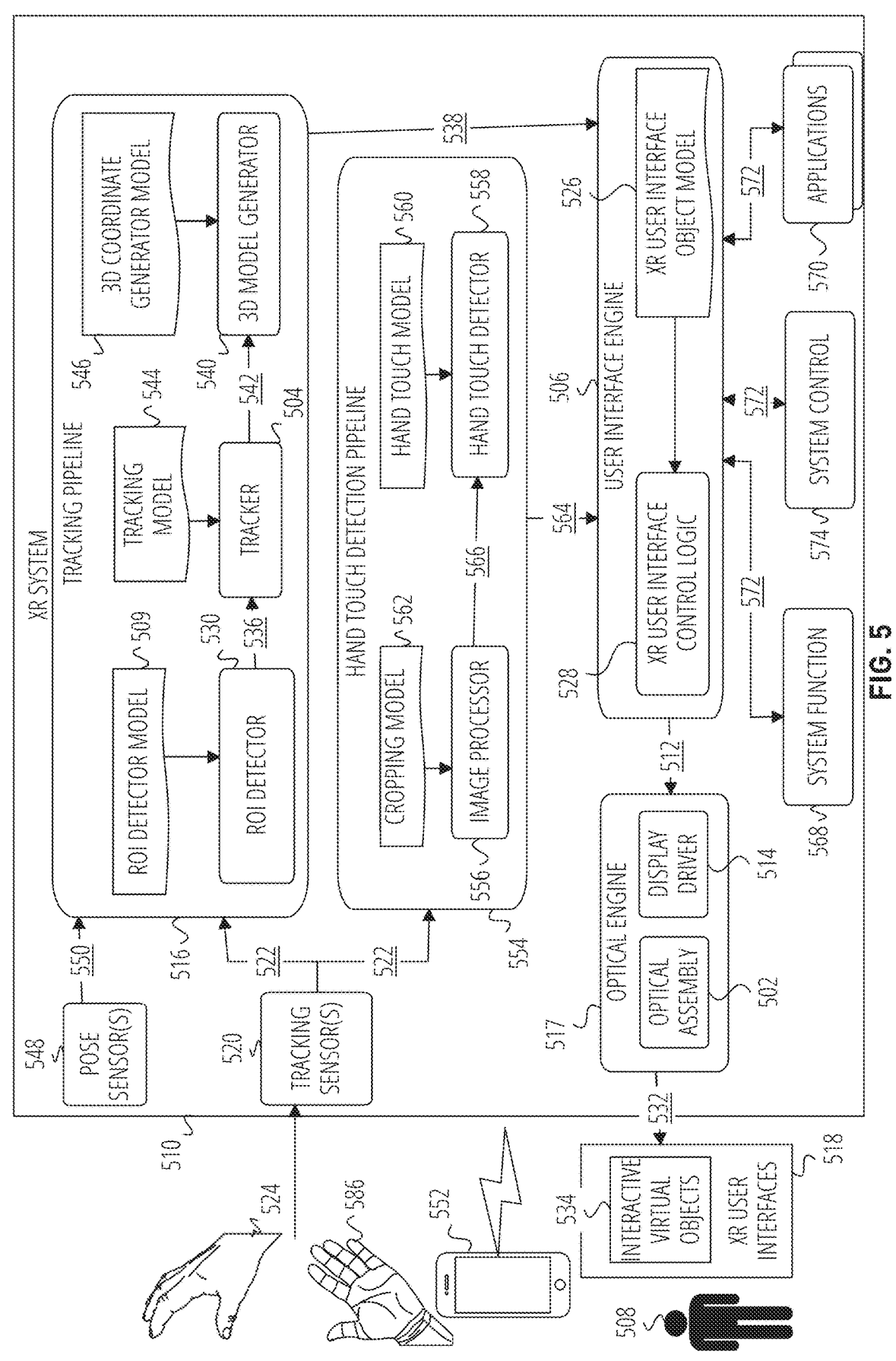
FIG. 5 illustrates a collaboration diagram of components of an XR system, according to some examples.

FIG. 5 illustrates a collaboration diagram of components of an XR system 510, such as head-wearable apparatus 100 of FIG. 1A, using hand-tracking for user input, according to some examples.

The XR system 510 uses 3D tracking data 538 and hand touch data 564 to provide continuous real-time input modalities to a user 508 of the XR system 510 where the user 508 interacts with one or more XR user interfaces 518 using hand-tracking and hand touch input modalities. Using the hand-tracking and hand touch input modalities, the XR system 510 generates user interface input/output (UI I/O) data 572 that are used by a system control component 574, one or more system function components system function component 568, and one or more applications 570 to generate one or more interactive user interfaces provided as part of the one or more XR user interfaces 518.

The applications 570 are applications that are executed by the XR system 510 and generate application user interfaces that provide features such as, but not limited to, maintenance guides, interactive maps, interactive tour guides, tutorials, and the like. The applications 570 can also be entertainment applications such as, but not limited to, video games, interactive videos, and the like.

The system function components 568 provide system function user interfaces that a user can use to perform various system-level functions. These system-level functions can include, but are not limited to:

Hand-Tracking and Hand touch Recognition Management: Manages configuration of the user input systems, providing real-time feedback through the system function user interface.

Contextual Help and Tips: Offers contextual help and tips providing relevant assistance based on the user's current activities.

Notification Management: Manages notifications and alerts, ensuring they are presented in a non-intrusive manner and allowing customization of notification settings.

User Customization Settings: Allows users to customize various system settings, including gesture sensitivity and display settings.

Application Management: Handles the launching, switching, and closing of applications, providing a seamless interaction with multiple applications.

Real-Time System Status Updates: Provides real-time updates on system status, such as battery life and connection status.

Security and Privacy Controls: Manages security settings and privacy controls, allowing users to configure these settings and providing prompts about security and privacy issues.

The system control component 574 provides one or more system control user interfaces that provide a consistent user interface for controlling the operating system of the XR system.

The XR system 510 generates the XR user interfaces 518 provided to the user 508 within an XR environment. The XR user interfaces 518 include one or more interactive virtual objects 534 that the user 508 can interact with. For example, a user interface engine 506 of FIG. 5 includes XR user interface control logic 528 comprising a dialog script or the like that specifies a user interface dialog implemented by the XR user interfaces 518. The XR user interface control logic 528 also comprises one or more actions that are to be taken by the XR system 510 based on detecting various dialog events such as user inputs input by the user 508 using the XR user interfaces 518 and by making hand gestures. The user interface engine 506 further includes an XR user interface object model 526. The XR user interface object model 526 includes 3D coordinate data of the one or more interactive virtual objects 534. The XR user interface object model 526 also includes 3D graphics data of the one or more interactive virtual objects 534. The 3D graphics data is used by an optical engine 517 to generate the XR user interfaces 518 for display to the user 508.

The user interface engine 506 generates XR user interface data 512 using the XR user interface object model 526. The XR user interface data 512 includes image data of the one or more interactive virtual objects 534 of the XR user interfaces 518. The user interface engine 506 communicates the XR user interface data 512 to a display driver 514 of an optical engine 517 of the XR system 510. The display driver 514 receives the XR user interface data 512 and generates display control signals using the XR user interface data 512. The display driver 514 uses the display control signals to control the operations of one or more optical assemblies 502 of the optical engine 517. In response to the display control signals, the one or more optical assemblies 502 generate an XR user interface graphics display 532 of the XR user interfaces 518 that are provided to the user 508.

While in use, the XR system 510 uses one or more tracking sensors 520 to detect and record a position, orientation, and gestures of the hands 524 of the user 508. This can involve capturing the speed and trajectory of hand movements, recognizing specific hand poses, and determining the relative positioning of the hands in the three-dimensional space of an XR environment.

In some examples, the one or more tracking sensors 520 comprise an array of optical sensors capable of capturing a wide range of hand movements and gestures in real-time as images. These sensors can include Red Green and Blue (RGB) cameras that capture images of the hands 524 of the user 508 using light having a broad wavelength spectrum, such as natural light provided by the real-world environment or artificial illumination created by one or more incandescent lamps, LED lamps, or the like provided by the XR system 510. In some examples, the one or more tracking sensors 520 can include infrared cameras that capture images of the hands 524 of the user 508 using energy in the infrared radiation (IR) spectrum. The IR energy can be supplied by one or more IR emitters of the XR system 510.

In some examples, the one or more tracking sensors 520 comprise depth-sensing cameras that utilize structured light or time-of-flight technology to create a three-dimensional model of the hands 524 of the user 508. This allows the XR system 510 to detect intricate gestures and finger movements with high accuracy.

In some examples, the one or more tracking sensors 520 comprise ultrasonic sensors that emit sound waves and measure the reflection off the hands 524 of the user 508 to determine their location and movement in space.

In some examples, the one or more tracking sensors 520 comprise electromagnetic field sensors that track the movement of the hands 524 of the user 508 by detecting changes in an electromagnetic field generated around the user 508.

In some examples, the one or more tracking sensors 520 include capacitive sensors embedded in gloves worn by the user 508. These sensors detect hand movements and gestures based on changes in capacitance caused by finger positioning and orientation.

In some examples, the XR system 510 includes one or more pose sensors 548 such as an Inertial Measurement Unit (IMU) and the like, that track the orientation and movements of the XR system of the user 508. The one or more pose sensors 548 are used to determine Six Degrees of Freedom (6DoF) data of movement of the XR system 510 in three-dimensional space. Specifically, the 6DoF data encompasses three translational movements along the x, y, and z axes (forward/back, up/down, left/right) and three rotational movements (pitch, yaw, roll) included in pose data 550. In the context of XR, 6DoF data is allows for the tracking of both position and orientation of an object or user in 3D space.

In some examples, the one or more pose sensors 548 include one or more cameras that capture images of the real-world environment. The images are included in the pose data 550. The XR system 510 uses the images and photogrammetric methodologies to determine 6DoF data of the XR system 510.

In some examples, the XR system 510 uses a combination of an IMU and one or more cameras to determine 6DoF for the XR system 510.

The XR system 510 uses a tracking pipeline 516 including a Region Of Interest (ROI) detector 530, a tracker 504, and a 3D model generator 540, to generate the 3D tracking data 538 using the tracking data 522 and the pose data 550.

The ROI detector 530 uses a ROI detector model 509 to detect a region in the real world environment that includes a hand 524 of the user 508. The ROI detector model 509 is trained to recognize those portions of the real-world environment that include a user's hands as more fully described in reference to FIG. 12A and FIG. 12B. The ROI detector 530 generates ROI data 536 indicating which portions of the tracking data 522 include one or more hands of the user 508 and communicates the ROI data 536 to the tracker 504.

The tracker 504 uses a tracking model 544 to generate 2D tracking data 542. The tracker 504 uses the tracking model 544 to recognize landmark features on portions of the one or both hands 524 of the user 508 captured in the tracking data 522 and within the ROI identified by the ROI detector 530. The tracker 504 extracts landmarks of the one or both hands 524 of the user 508 from the tracking data 522 using computer vision methodologies including, but not limited to, Harris corner detection, Shi-Tomasi corner detection, Scale-Invariant Feature Transform (SIFT), Speeded-Up Robust Features (SURF), Features from Accelerated Segment Test (FAST), Oriented FAST and Rotated BRIEF (ORB), and the like. The tracking model 544 operates on the landmarks to generate the 2D tracking data 542 that includes a sequence of skeletal models of one or more hands of the user 508. The tracking model 544 is trained to generate the 2D tracking data 542 as more fully described in reference to FIG. 12A and FIG. 12B. The tracker communicates the 2D tracking data 542 to the 3D model generator 540.

The 3D model generator 540 receives the 2D tracking data 542 and generates 3D tracking data 538 using the 2D tracking data 542, the pose data 550, and a 3D coordinate generator model 546. For example, the 3D model generator 540 determines a reference position in the real-world environment for the XR system 510. The 3D model generator 540 uses a 3D coordinate generator model 546 that operates on the 2D tracking data 542 to generate the 3D tracking data 538. The 3D coordinate generator model 546 is trained to generate the 3D tracking data 538 as more fully described in reference to FIG. 12A and FIG. 12B.

In some examples, the tracker 504 generates the 3D tracking data 538 using photogrammetry methodologies to create 3D models of the hands of the user 508 from the 2D tracking data 542 by capturing overlapping pictures of the hands of the user 508 from different angles. In some examples, the 2D tracking data 542 includes multiple images taken from different angles, which are then processed to generate the 3D models that are included in the 3D tracking data 538. In some examples, the XR system 510 uses the pose data 550 captured by one or more pose sensors 548 to determine an angle or position of the XR system 510 as an image is captured of the hands of the user 508.

The XR system 510 uses a hand touch detection pipeline 554 including an image processor 556 and a hand touch detector 558 to generate hand touch data 564 using the tracking data 522.

In some examples, the image processor 556 extracts features from the tracking data 522 using computer vision methodologies including, but not limited to, Harris corner detection, Shi-Tomasi corner detection, Scale-Invariant Feature Transform (SIFT), Speeded-Up Robust Features (SURF), Features from Accelerated Segment Test (FAST), Oriented FAST and Rotated BRIEF (ORB), and the like. The image processor 556 operates on the features to generate the cropped image data 566. The image processor 556 is trained to generate the cropped image data 566 as more fully described in reference to FIG. 12A and FIG. 12B.

In some examples, images in the tracking data 522 are processed by an image processor 556 to enhance the images for better clarity and contrast, making it easier for the XR system 510 to extract features from the tracking data 522. In some examples, the image processor 556 uses image enhancement methodologies such as, but not limited to: histogram equalization, which adjusts the contrast of an image by redistributing the intensity values; Gaussian smoothing, which reduces noise and detail by averaging pixel values with a Gaussian kernel; unsharp mask filtering, which enhances edges by subtracting a blurred version of the image from the original; Wiener filtering, which removes noise and deblurs images by accounting for both the degradation function and the statistical properties of noise; Contrast-Limited Adaptive Histogram Equalization (CLAHE), which improves local contrast and enhances the definition of edges in an image; median filtering, which reduces noise by replacing each pixel's value with the median value of the intensities in its neighborhood; point operations, which apply the same transformation to each pixel based on its original value, such as intensity transformations; spatial filtering, which involves convolution of the image with a kernel to achieve effects like blurring or sharpening; and the like.

In some examples, the image processor 556 filters the images to remove background noise and enhance the visibility of a portion of a hand 524 and a digit used by the user 508 to make the hand touch. This processing helps the XR system 510 to accurately detect and interpret the specific interactions intended by the user 508. This capability is useful in complex visual environments where background noise could otherwise interfere with the ability of the XR system 510 to correctly detect a hand touch.

The image processor 556 detects portions of images of the tracking data 522 that include image data of the hands 524 and 586 of the user 508 and crops the images to generate cropped image data 566 including the image data of the hands 524 and 586. The image processor 556 generates the cropped image data 566 and communicates the cropped image data 566 to the hand touch detector 558.

In some examples, the image processor 556 uses a cropping model 562 to crop the images of the tracking data 522 that include image data of the hands 524 and hand 586. Training of the cropping model 562 more fully described in reference to FIG. 12A and FIG. 12B.

In some examples, the image processor 556 uses a hand tracking process to isolate a palmar surface or a hand dorsal surface in images of the hands 524 and 586 of the user 508. This process is useful for focusing the analysis on the most relevant part of a palmar surface or a hand dorsal surface for interaction, which enhances the ability of the XR system 510 to accurately detect and interpret user inputs. By isolating the palmar surface or hand dorsal surface, the XR system 510 can more effectively process and respond to gestures and touches, improving the overall user experience in XR applications. This targeted processing helps in reducing noise and distractions from other parts of the hand or background, improving the precision and reliability of the hand touch detection.

In some examples, the image processor 556 uses the hand tracking process to crop an image to isolate an area around a tip of a digit being used by the user 508 to make a hand touch.

In some examples, the image processor 556 adjusts the cropping of the cropped images to enhance features indicative of the hand touch. This adjustment is useful for improving the accuracy of hand touch detection by focusing on specific areas of the image where hand touch interactions are most likely to occur. By enhancing these features, the XR system 510 can more effectively interpret user inputs, leading to a more responsive and intuitive user experience within the XR environment. This capability is particularly useful for applications requiring precise control and interaction, such as virtual reality gaming or complex navigational tasks in augmented reality settings.

Figure 6:
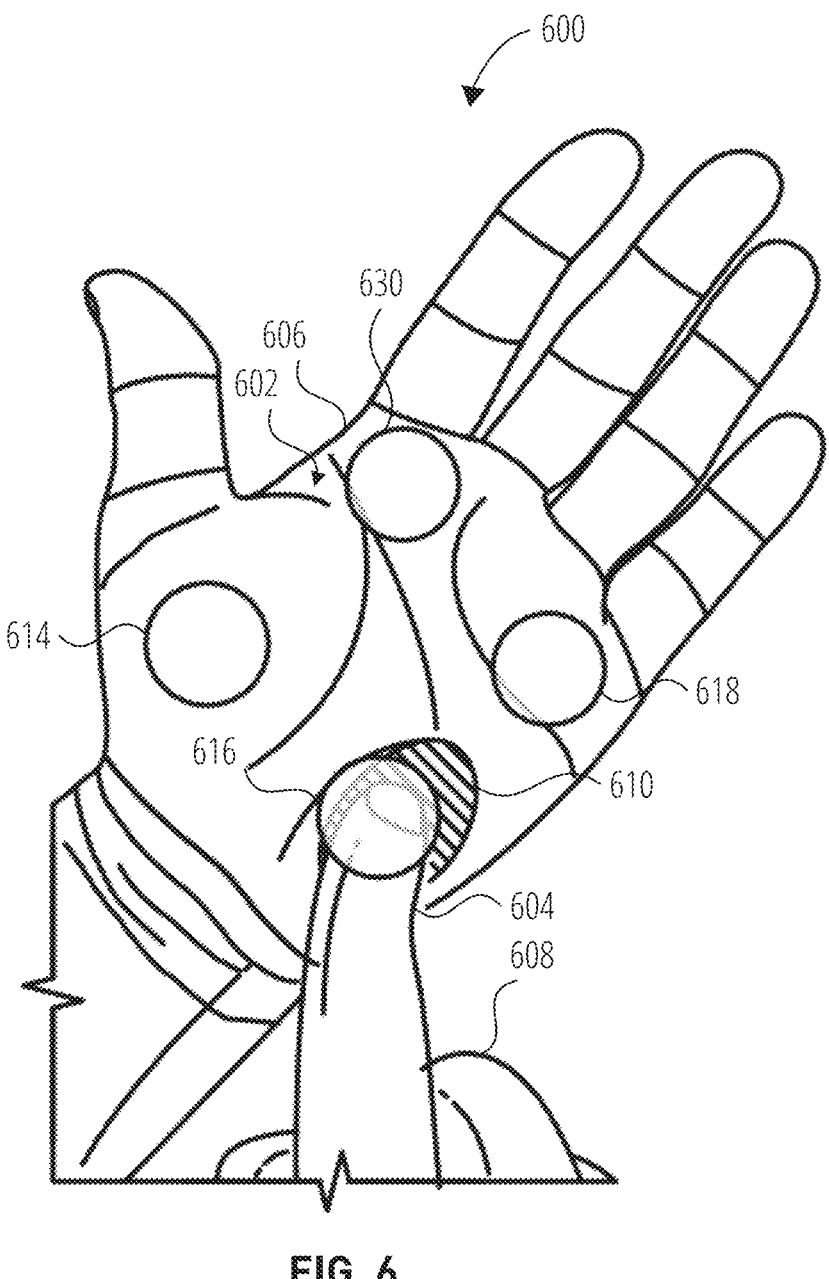
FIG. 6 illustrates a palmar surface system control user interface, according to some examples.

The hand touch detector 558 uses a hand touch model 560 to generate the hand touch data 564. The hand touch detector 558 uses the hand touch model 560 to recognize when the user 508 touches a portion of a first one of their hands 524 and 586 using one or more digits of a second one of their hands 524 and 586. FIG. 6 illustrates a illustrates a hand touch event of a palmar surface 602 of a first hand 606 of a user by a digit 604 of a second hand 608 of the user. As shown, the digit 604 pressing against the palmar surface 602 generates a deformation 610 in a surface of the palmar surface 602 that can be detected using the image data of the palmar surface 602.

In some examples, the portion of the hand being touched is the palmar surface of the non-dominant hand of the user and the one or more digits are one or more digits of the dominant hand of the user.

In some examples, the portion of the hand being touched is the hand dorsal surface of the non-dominant hand of the user and the one or more digits are one or more digits of the dominant hand of the user.

In some examples, the portion of the hand being touched is the palmar surface of the dominant hand of the user and the one or more digits are one or more digits of the non-dominant hand of the user.

In some examples, the portion of the hand being touched is the hand dorsal surface of the dominant hand of the user and the one or more digits are one or more digits of the non-dominant hand of the user.

When a hand touch is detected by the hand touch detection pipeline 554, the hand touch detection pipeline 554 communicates hand touch data 564 including data of the hand touch to the user interface engine 506.

Figure 12A:
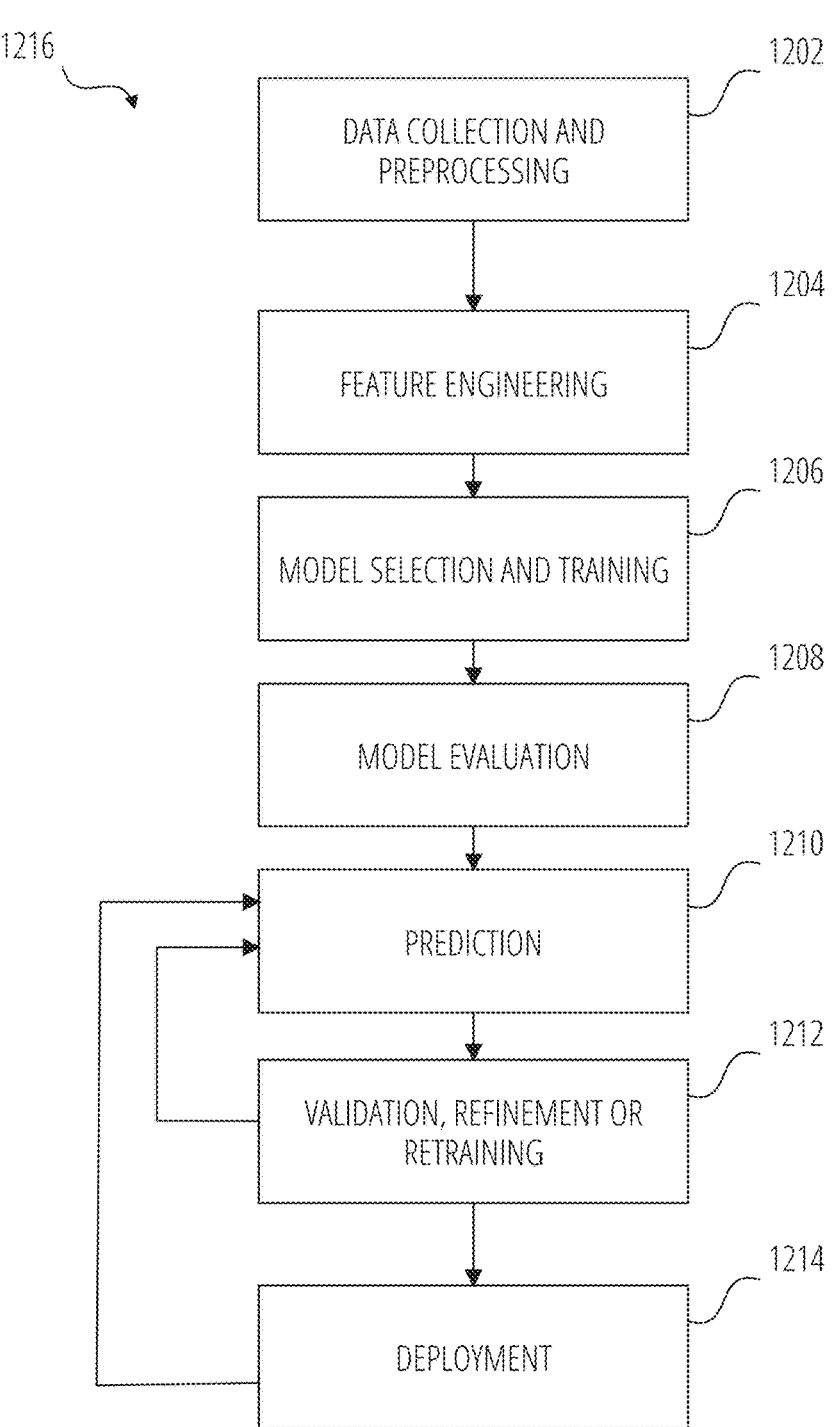
FIG. 12A illustrates a machine-learning pipeline, according to some examples.
Figure 12B:
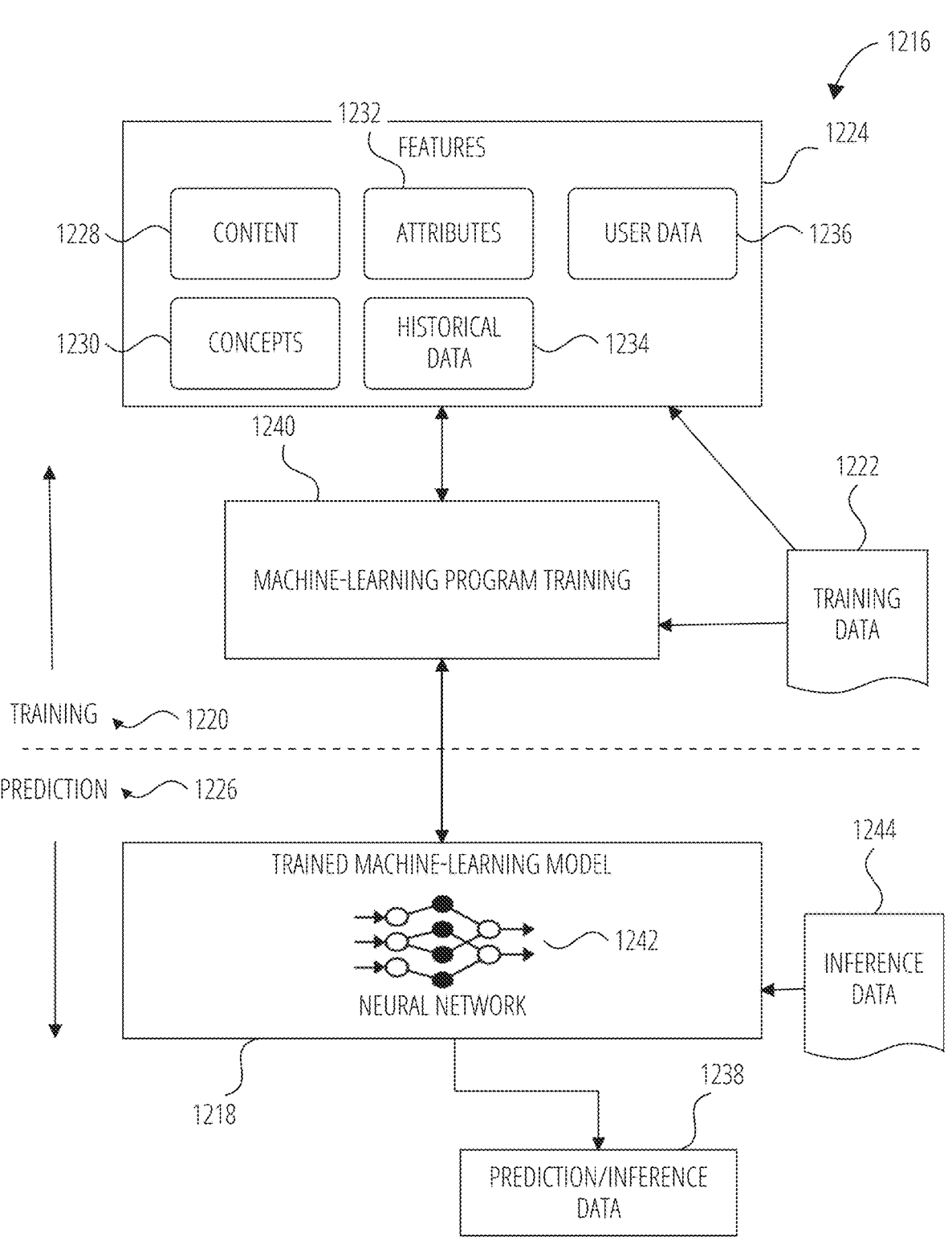
FIG. 12B illustrates training and use of a machine-learning program, according to some examples.

The hand touch model 560 is trained to generate the hand touch data 564 as more fully described in reference to FIG. 12A, and FIG. 12B.

In some examples, the hand touch model 560 is retrained using a training data collected by the XR system as the XR system prompts the user 508 to perform specific operations such as, but not limited to, holding a digit over a palm of one their hands, palm touching specific portions of their palm, and the like. This retraining process is useful for personalizing the model to the specific characteristics and preferences of the user 508. By incorporating user-specific data, the XR system 510 can enhance hand touch accuracy and responsiveness to a user's unique way of interacting with the XR system 510. This capability is particularly beneficial in applications where user comfort and customization improve the overall experience, such as in personalized virtual assistance or adaptive gaming environments.

In some examples, the hand touch detection sensitivity of the hand touch detection pipeline 554 is calibrated using a set of individual hand characteristics of the user 508. This calibration process is useful for tailoring the system's sensitivity to the unique physical attributes of the user's hands, such as size, shape, and touch pressure tendencies.

In some examples, detecting a hand touch of a palm by a digit of a hand includes interpolating between different hand touch pressure levels detected in the cropped images. For example, the hand touch detector 558 uses the hand touch model 560 to detect variations in visual cues such as, but not limited to, shadowing, indentation, skin deformation, and the like, which are captured in the cropped images. By interpolating these subtle differences, the XR system 510 can determine not just the presence of a touch, but also the varying degrees of pressure applied. In some examples, the hand touch detector 558 generates data of a hand touch that includes a continuous parameter that has a value representing states of a hand touch from a hover state to a hard press state. As an example, the continuous value can be a real number having a range from 0.0 to 2.0 where 0.0 represents a hover of a digit over a palm, 1.0 represents a light pressure hand touch, and 2.0 represents a heavy pressure hand touch, and a value between 0.0 and 1.0 represents a distance between the digit and the palm without a hand touch corresponding to the user 508 holding their digit 604 just above their palmar surface 602 in a hover position.

In some examples, the one or more tracking sensors 520 include one or more visible light cameras such as, but not limited to, RGB cameras, that capture the images of the hands 524 of user 508. The cropped images are processed by the image processor 556 to emphasize depth cues visible in the hands 524 of the user in the RGB spectrum. This processing is useful for enhancing the visual information used for accurately interpreting hand movements and interactions within the XR environment. By emphasizing depth cues, the XR system 510 can more effectively discern the spatial relationships and gestures of the user's hands, leading to more precise and responsive interactions in virtual and augmented reality applications.

In some examples, the XR system 510 is operably connected to a mobile device 552. The user 508 can use the mobile device 552 to configure the XR system 510. In some examples, the mobile device 552 functions as an alternative input modality.

In some examples, an XR system performs the functions of the tracking pipeline 516, the hand touch detection pipeline 554, the user interface engine 506, and the optical engine 517 utilizing various APIs and system libraries.

FIG. 6 illustrates a palmar surface XR user interface 600, according to some examples. An XR system uses the palmar surface XR user interface 600 to provide a hand-located user input modality to a user. To do so, the XR system 510 uses the user interface engine 506 of FIG. 5 to generate the palmar surface XR user interface 600 as more fully described in reference to FIG. 5. As illustrated in FIG. 6, the palmar surface XR user interface 600 includes one or more interactive virtual objects 534 include interactive virtual object 614, interactive virtual object 630, interactive virtual object 618, and interactive virtual object 630. 3D location data of the interactive virtual objects of the palmar surface XR user interface 600 are stored in the XR user interface object model 526.

In some examples, the one or more interactive virtual objects are provided to the user in association with a specified location of the palmar surface 602 of the first hand 606 of the user. For example, an interactive virtual object can be provided in association with specific fleshy portions of the palmar surface 602 such as, but not limited to, the thenar eminence at the thumb base, the hypothenar eminence at the little finger side of the palmar surface 602, one or more interdigital spaces between fingers, and the like.

Interactive virtual object 614, interactive virtual object 616, interactive virtual object 618, and interactive virtual object 630 are provided to the user 508 overlaid on the palmar surface 602 of a first hand 606 of the user 508. The user 508 interacts with the interactive virtual object 614, interactive virtual object 616, interactive virtual object 618, and interactive virtual object 630 by touching their palm with a digit 604 of a second hand 608 to a portion of their palmar surface 602 that corresponds to an apparent location on their palm of the interactive virtual object 614, interactive virtual object 616, interactive virtual object 618, or interactive virtual object 630. As the palmar surface 602 is touched by the digit 604, a deformation 610 is formed in a fleshy part of the palm that can be detected as a hand touch at the location of an interactive object, such as interactive virtual object 616.

In some examples, interactive virtual object 614, interactive virtual object 616, interactive virtual object 618, and interactive virtual object 630 are provided on a non-dominant hand of the user and the user uses one or more digits of their dominant hand to touch the palmar surface 602 of the non-dominant hand.

In some examples, interactive virtual object 614, interactive virtual object 616, interactive virtual object 618, and interactive virtual object 630 are provided on a dominant hand of the user and the user uses one or more digits of their non-dominant hand to touch the palmar surface 602 of the dominant hand.

In some examples, an XR system can be configured to display the palmar surface XR user interface 600 on a non-dominant hand of the user by default. In other examples, an XR system can be configured to display the palmar surface XR user interface 600 on a dominant hand of the user by default.

The XR system 510 captures images including images of the first hands 606 and 608. For example, the XR system 510 utilizes one or more cameras included in the one or more tracking sensors 520 of the XR system 510 to capture tracking data 522. The tracking data 522 includes images of the first hands 606 and 608 of the user 508 as the user 508 interacts with the XR user interfaces 518. For example, the XR system 510 uses the hand touch detector 558 of FIG. 5 to detect the hand touch of the palmar surface 602 of the first hand 606 by the digit 604 of the other second hand 608 using the hand touch model 560 of FIG. 5 as more fully described in reference to FIG. 5.

The XR system 510 provides the detected hand touch of the palmar surface 602 of the user 508 as an input into the XR user interfaces 518 provided to the user 508. For example, hand touch data 564 including data of the hand touch by the digit 604 to the palmar surface 602 of the first hand 606 is communicated to the user interface engine 506 by the hand touch detection pipeline 554. Simultaneously, 3D tracking data 538 including data of the 3D location of the first hand 606 including the palmar surface 602, and the digit 604 is communicated to the user interface engine 506 by the tracking pipeline 516. The user interface engine 506 receives the hand touch data 564 from the hand touch detection pipeline 554 and the 3D tracking data 538 from the tracking pipeline 516. The user interface engine 506 uses the data of the hand touch to the palmar surface 602, the data of the 3D location of the first hand 606 including the palmar surface 602, and the data of the 3D location of interactive virtual object 614, interactive virtual object 616, interactive virtual object 618, and interactive virtual object 630 stored in the XR user interface object model 526 to determine if the user 508 has touched their palm at a location that corresponds to a location of one or more of the interactive virtual objects 614, 616, 618, and 630. In response to determining that the user 508 has touched their palm a location that corresponds to a location of one or more of the interactive virtual objects 614, 616, 618, and 630, the user interface engine 506 determines that the user 508 has selected and is interacting with the determined interactive virtual object.

In some examples, the palmar surface XR user interface 600 can be invoked using one or more gestures by a user. For example, the user can close a hand into a fist, turn their first palm-up, and then open their first exposing the palmar surface 602 such that the palmar surface 602 is facing upward. The XR system 510 detects this sequence of gestures and initiates generation of the palmar surface XR user interface 600 associated with the hand used by the user to make the sequence of one or more gestures. For example, if the user uses their dominant hand as a first hand for locating the palmar surface XR user interface 600, the user makes the first with their dominant hand to locate the palmar surface XR user interface 600 on their dominant hand. As another example, if the user uses their non-dominant hand as a first hand for locating the palmar surface XR user interface 600, the user makes the first with their non-dominant hand to locate the palmar surface XR user interface 600 on their non-dominant hand.

In some examples, a size of the interactive virtual objects as rendered and provided to a user and a size of the respective areas on the palmar surface 602 associated with the interactive virtual objects are scaled in proportion to a size of the first hand 606. This scaling ensures that the interactive elements are appropriately sized relative to the user's hand dimensions, enhancing the ergonomic and intuitive use of the user interface. This proportional scaling aids in maintaining usability and comfort, ensuring that the virtual objects are neither too small to interact with effectively nor too large to cause awkwardness or reduce the functional area of the palm.

For example, the XR system 510 uses one or more sensors to capture the physical dimensions of the first hand 606, specifically focusing on the palmar surface 602. The XR system 510 measures aspects such as the width, length, and curvature of the palmar surface 602, which are used for accurate scaling. Based on the captured dimensions, the XR system 510 calculates scaling factors for the interactive virtual objects. These factors are determined to provide that the size of each virtual object is proportional to the size of the first hand 606, providing a consistent and ergonomic user experience. The scaling factors can consider the overall hand size and specific zones on the palmar surface 602 where the interactive virtual objects will be provided. Using the scaling factors, the XR system 510 adjusts the dimensions of the interactive virtual objects. This adjustment provides that the interactive virtual objects are neither too large to overlap uncomfortably over the palm nor too small to be difficult to interact with. In some examples, the XR system 510 uses algorithms to dynamically resize the objects based on real-time measurements, accommodating variations in user hand sizes. The appropriately scaled interactive virtual objects are then rendered on the palmar surface 602 of the first hand 606 within the XR environment. The rendering process considers the visual and tactile feedback necessary for interaction, providing for the display of the interactive virtual objects at optimal sizes for touch interaction and visual recognition.

In some examples, the user closes the palmar surface XR user interface 600 by making a gesture with the first hand 606 associated with the palmar surface XR user interface 600. For example, the user makes a first with the first hand 606 associated with the palmar surface XR user interface 600. The XR system 510 detects the closing of the first hand 606 into a first and the XR system 510 closes the palmar surface XR user interface 600.

In some examples, the palmar surface XR user interface 600 located on the palmar surface 602 provides a tactile physical feedback, enhancing user interaction through tactile responses. This tactile interaction offers a more satisfying experience compared to mid-air gestures, because use of the palmar surface XR user interface 600 involves direct physical contact by the user with the palmar surface 602. Such contact is not only more intuitive but also reinforces the user's actions by providing immediate physical sensations.

In some examples, the sensation of pressing interactive virtual objects located on the palmar surface 602 confirms user actions without the need for visual cues, which is particularly advantageous in XR environments. In these XR environments, users often have to split their visual attention between virtual and real-world elements. The tactile feedback from the palmar surface XR user interface 600 aids in reducing cognitive load and enhancing the overall interaction efficiency, ensuring that users can operate the system confidently even without constant visual confirmation.

In some examples, the ergonomic location of interactive virtual objects on the palmar surface 602 of the first hand 606 is designed to optimize accessibility and comfort. This includes strategically positioning buttons along the edges of the palmar surface 602. Such placement is chosen to align with natural hand movements and case of access, enhancing the overall user experience.

In some examples, the design of the palmar surface XR user interface 600 intentionally avoids placing buttons in sensitive or ticklish areas of the hand, such as the center of the palm or near the wrist, to prevent discomfort or involuntary reactions during use. Instead, interactive virtual objects are positioned in areas that are less sensitive yet remain easily accessible for pressing.

Furthermore, the design of the palmar surface XR user interface 600 utilizes the concept of proprioception, which is the user's innate awareness of their body's position and movement. By integrating the interactive virtual objects on the palmar surface 602, the palmar surface XR user interface 600 allows users to interact with the palmar surface XR user interface 600 intuitively and without the need to visually confirm each action. This design choice reduces cognitive load and enhances usability, making the interaction both efficient and user-friendly.

Figure 7:
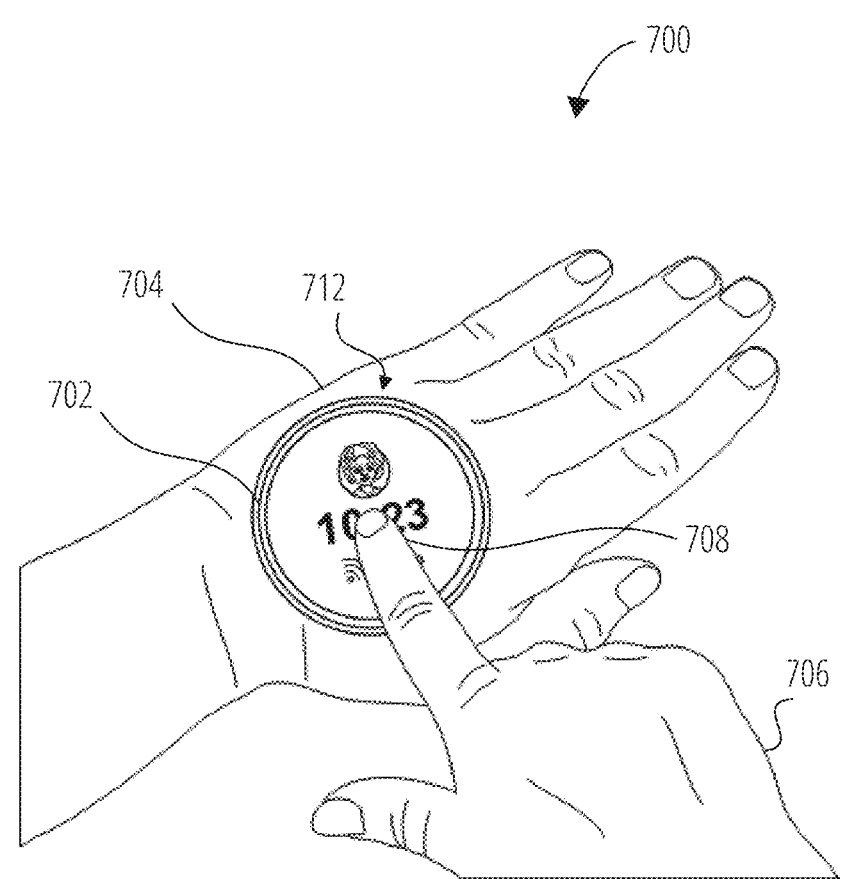
FIG. 7 illustrates a hand dorsal surface system control user interface, according to some examples.

FIG. 7 illustrates a back of hand or hand dorsal surface XR user interface 700, according to some examples. An XR system 510 of FIG. 5 uses the hand dorsal surface XR user interface 700 to provide a hand-located user input modality to a user 508 of FIG. 5. To do so, the XR system 510 uses the user interface engine 506 of FIG. 5 to generate the hand dorsal surface XR user interface 700 as a component of the XR user interfaces 518 as more fully described in reference to FIG. 5. The hand dorsal surface XR user interface 700 includes one or more interactive virtual objects including interactive virtual object 702. 3D location data of the interactive virtual objects of the hand dorsal surface XR user interface 700 are stored in the XR user interface object model 526.

In some examples, the one or more interactive virtual objects are provided to the user in association with a specified location of the hand dorsal surface 712 of the hand 704 of the user 508. The user 508 interacts with the interactive virtual object 702 by touching the hand dorsal surface 712 with a digit 708 of a second or other hand 706 to a portion of the hand dorsal surface 712 that corresponds to an apparent location on the hand dorsal surface 712 of the interactive virtual object 702. As the hand dorsal surface 712 is touched by the digit 708, a deformation is formed on the hand dorsal surface 712 that can be detected as a hand touch at the location of an interactive object, such as the interactive virtual object 702.

In some examples, the interactive virtual object 702 is provided on a non-dominant hand of the user and the user uses one or more digits of their dominant hand to touch the hand dorsal surface of the non-dominant hand.

In some examples, the interactive virtual object 702 is provided on a dominant hand of the user and the user uses one or more digits of their non-dominant hand to touch the hand dorsal surface of the dominant hand.

In some examples, an XR system can be configured to provide the hand dorsal surface XR user interface 700 on a non-dominant hand of the user by default. In other examples, an XR system can be configured to provide the hand dorsal surface XR user interface 700 on a dominant hand of the user.

As the user 508 touches the hand dorsal surface 712, the XR system 510 captures images including images of the hands hand 704 and hand 706. For example, the XR system 510 utilizes one or more cameras included in the one or more tracking sensors 520 of the XR system 510 to capture tracking data 522. The tracking data 522 includes images of the hands hand 704 and hand 706 of the user 508 as the user 508 interacts with the XR user interfaces 518. The XR system 510 uses the hand touch detector 558 of FIG. 5 to detect the hand touch of the hand dorsal surface 712 of the first hand 606 by the digit 708 of the other hand 706 using the hand touch model 560 of FIG. 5 as more fully described in reference to FIG. 5. The XR system 510 provides the detected hand touch of the hand dorsal surface 712 at the location of the interactive virtual object 702 as an input into the XR user interfaces 518 provided to the user 508.

For example, hand touch data 564 including data of the hand touch by the digit 708 to the hand dorsal surface 712 of the hand 704 is communicated to the user interface engine 506 by the hand touch detection pipeline 554. Simultaneously, 3D tracking data 538 including data of the 3D location of the hand 704 including the hand dorsal surface 712, and the digit 708 is communicated to the user interface engine 506 by the tracking pipeline 516. The user interface engine 506 receives the hand touch data 564 from the hand touch detection pipeline 554 and the 3D tracking data 538 from the tracking pipeline 516. The user interface engine 506 uses the data of the hand touch to the hand dorsal surface 712, the data of the 3D location of the hand 704 including the hand dorsal surface 712, and the data of the 3D location of the interactive virtual object 702 to determine if the user 508 has touched the hand dorsal surface 712 at a location that corresponds to a location of the interactive virtual object 702. In response to determining that the user 508 has touched the hand dorsal surface 712 at a location that corresponds to a location of the interactive virtual object 702, the user interface engine 506 determines that the user 508 has selected and is interacting with the determined interactive virtual object.

In some examples, one or more of the interactive virtual objects of the hand dorsal surface XR user interface 700 can be used to programmatically display various status information of the XR system 510. The various status information can include, but is not limited to:

Battery Level: Shows the current battery status and remaining power percentage, alerting the user when recharging is necessary.

Network Connectivity: Indicates the status of wireless connections such as Wi-Fi strength, Bluetooth connectivity, and mobile network availability.

Volume Level: Displays the current volume setting and allows for adjustments to ensure audio levels are suitable for the environment and user preference.

Brightness Level: Shows the current screen brightness and provides options for adjustment to suit different lighting conditions.

System Time: Displays the current time, which can be synchronized with internet time servers to ensure accuracy.

Active User Profile: Indicates which user profile is currently active, especially useful in devices shared among multiple users.

Memory Usage: Shows the amount of RAM currently in use and the total available, helping users manage system resources effectively.

Storage Space: Displays the used and available storage space, aiding in data management and application installation decisions.

Running Applications: Lists applications that are currently active, allowing users to switch between them or close them as needed.

System Notifications: Provides alerts about system events, updates, or other important information that requires user attention.

Security Status: Informs about the security level of the device, including any breaches, firewall status, or antivirus updates.

In some examples, hand dorsal surface XR user interface 700 can be invoked using one or more gestures by a user. For example, the user may turn their hand 704 so that the hand dorsal surface 712 faces upward and flattens their hand 704 so that their fingers are extended. The XR system 510 detects this sequence of one or more gestures and generates the hand dorsal surface XR user interface 700 associated with the hand used by the user to make the sequence of one or more gestures. For example, if the user uses their dominant hand as a first hand for locating the hand dorsal surface XR user interface 700, the user makes the gesture of the hand dorsal surface facing upward with extended fingers with their dominant hand to locate the hand dorsal surface XR user interface 700 on their dominant hand. As another example, if the user uses their non-dominant hand as a first hand for locating the hand dorsal surface XR user interface 700, the user makes the gesture of the hand dorsal surface facing upward with extended fingers with their non-dominant hand to locate the hand dorsal surface XR user interface 700 on their non-dominant hand.

In some examples, the user closes the hand dorsal surface XR user interface 700 by making a gesture with the hand 704 associated with the hand dorsal surface XR user interface 700. For example, the user turns their hand 704 so that the hand dorsal surface 712 is no longer facing upward while also relaxing their fingers. The XR system 510 detects the turning of the hand 704 and relaxation of the fingers and closes the hand dorsal surface XR user interface 700.

In some examples, the hand dorsal surface XR user interface 700 located on the hand dorsal surface 712 provides a tactile physical feedback, enhancing user interaction through tactile responses. This tactile interaction offers a more satisfying experience compared to mid-air gestures, because use of the hand dorsal surface XR user interface 700 involves direct physical contact by the user with the hand dorsal surface 712 of their own hand. Such contact is not only more intuitive but also reinforces the user's actions by providing immediate physical sensations. In addition, the sensation of pressing interactive virtual objects located on the hand dorsal surface 712 confirms user actions without the need for visual cues, which is particularly advantageous in XR environments. In these XR environments, users often have to split their visual attention between virtual and real-world elements. The tactile feedback from the hand dorsal surface XR user interface 700 aids in reducing cognitive load and enhancing the overall interaction efficiency, ensuring that users can operate an XR system confidently even without constant visual confirmation.

Figure 8:
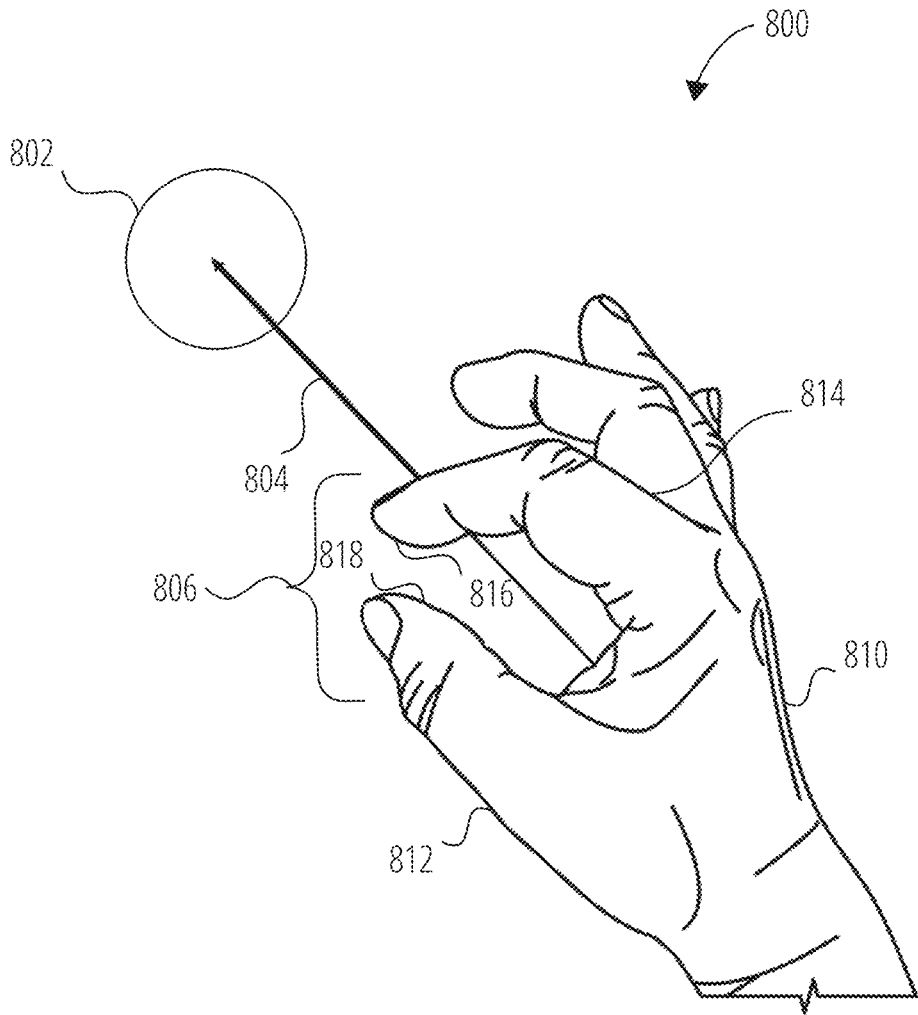
FIG. 8 illustrates a ray casting and pinch selection input modality, according to some examples.

FIG. 8 illustrates a ray cast and pinch user input modality 800, according to some examples. An XR system 510 of FIG. 5 uses the ray cast and pinch user input modality 800 to provide an input modality to a user 508 of FIG. 5 while the user 508 interacts with one or more interactive virtual objects 534 of FIG. 5 of the XR user interfaces 518 of FIG. 5.

The XR system 510 captures tracking data 522 of FIG. 5 using one or more tracking sensors 520 of FIG. 5 and pose data 550 of FIG. 5 using one or more pose sensors 548 of FIG. 5) a hand 810 of the user 508. The XR system 510 generates 3D tracking data 538 of FIG. 5 using a tracking pipeline 516 of FIG. 5 and the pose data 550 and tracking data 522 as further described in reference to FIG. 5. The 3D tracking data 538 includes 3D geometry data of the hand 810 including a 3D location, position, and orientation data.

The XR system 510 uses a user interface engine 506 to generate a ray cast cursor 804 as a virtual object in the XR user interface object model 526 of FIG. 5. The ray cast cursor 804 has an origin point located on the palmar surface of the hand 810. The ray cast cursor 804 includes a direction vector orthogonal to the palmar surface and projecting from the origin point.

The user 508 positions the ray cast cursor 804 by orienting their hand such that the projected ray cast cursor 804 intersects with an interactive virtual object 802 provided within the user's field of view. The XR system 510 continuously updates the cursor's position based on real-time tracking data 522 of the movement of the hand 810 by the user 508. As the user maneuvers their hand 810, adjustments are made to the trajectory of the ray cast cursor 804 so that the user 508 can point to the interactive virtual object 802. The XR system 510 detects when the ray cast cursor 804 intersects with the virtual object, the XR system 510 visually indicates the intersection to the user 508 by changes in the appearance of the ray cast cursor 804 or the interactive virtual object 802, such as highlighting or color change.

Concurrently, the XR system 510 monitors for specific hand gestures indicative of user input. When the user 508 positions the ray cast cursor 804 over the desired interactive virtual object 802, the user 508 performs a pinch gesture 806, detected by the XR system 510 through analysis of the 3D tracking data 538. In some examples, the pinch gesture 806 involves the user 508 bringing their thumb 812 and another digit, such as the index finger 814, together while the ray cast cursor 804 is intersecting the interactive virtual object 802. In some examples, the XR system 510 detects this gesture by analyzing changes in the distances between the fingertips 816 and 818 of the digits, confirming the gesture when the distance between the fingertips of the digits meet or fall below a proximity threshold value as defined by a sensitivity setting.

Upon successful detection of the pinch gesture 806 while the ray cast cursor 804 is held on the interactive virtual object 802, the XR system executes a predefined action associated with the interactive virtual object 802. This action could range from selecting the object, triggering an animation, opening a menu, or other interactive responses programmed within the user interface engine 506.

Figure 9B:
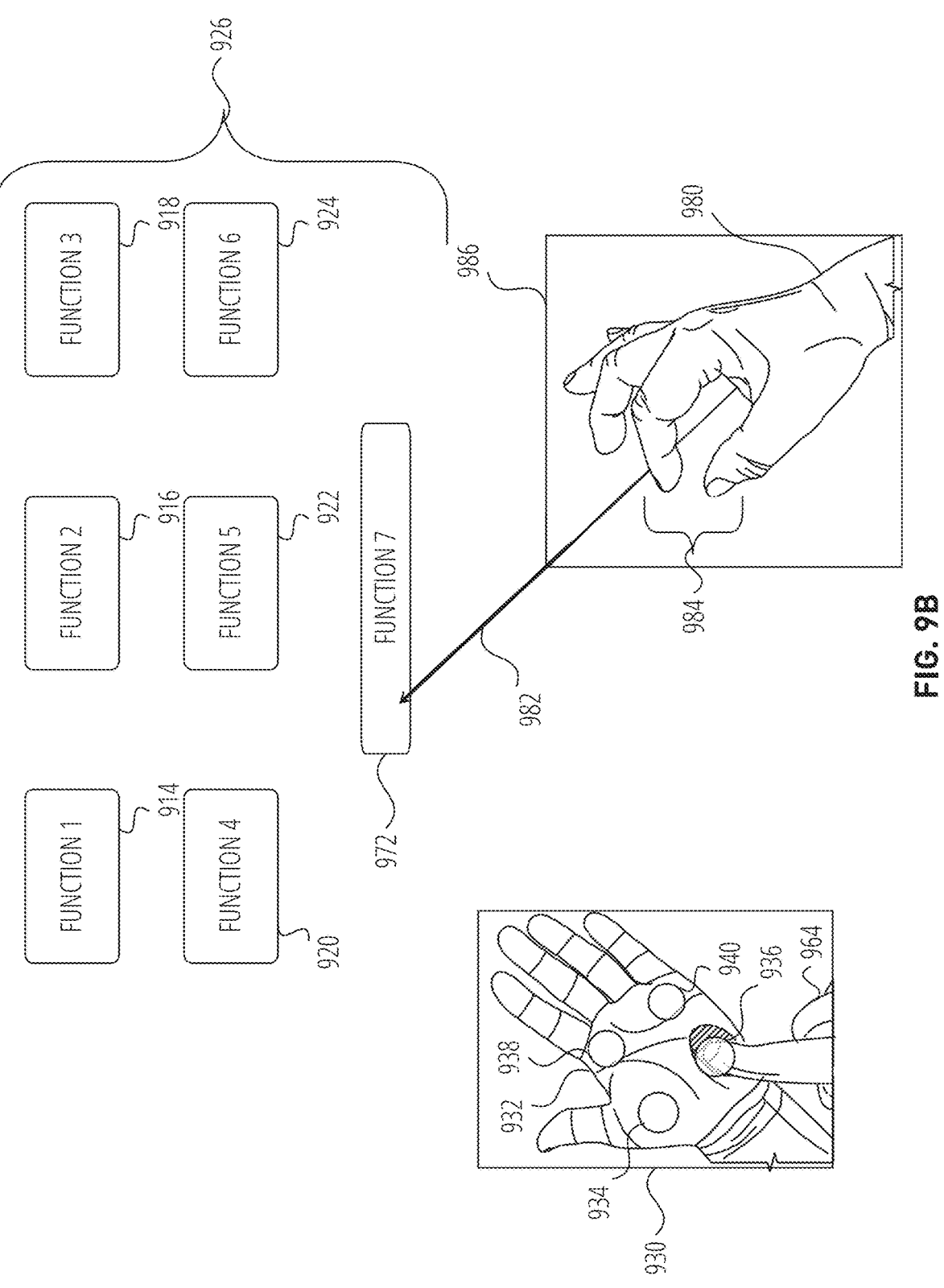
FIG. 9B illustrates use of a palmar surface system control user interface in conjunction with a system function user interface, according to some examples.
Figure 9C:
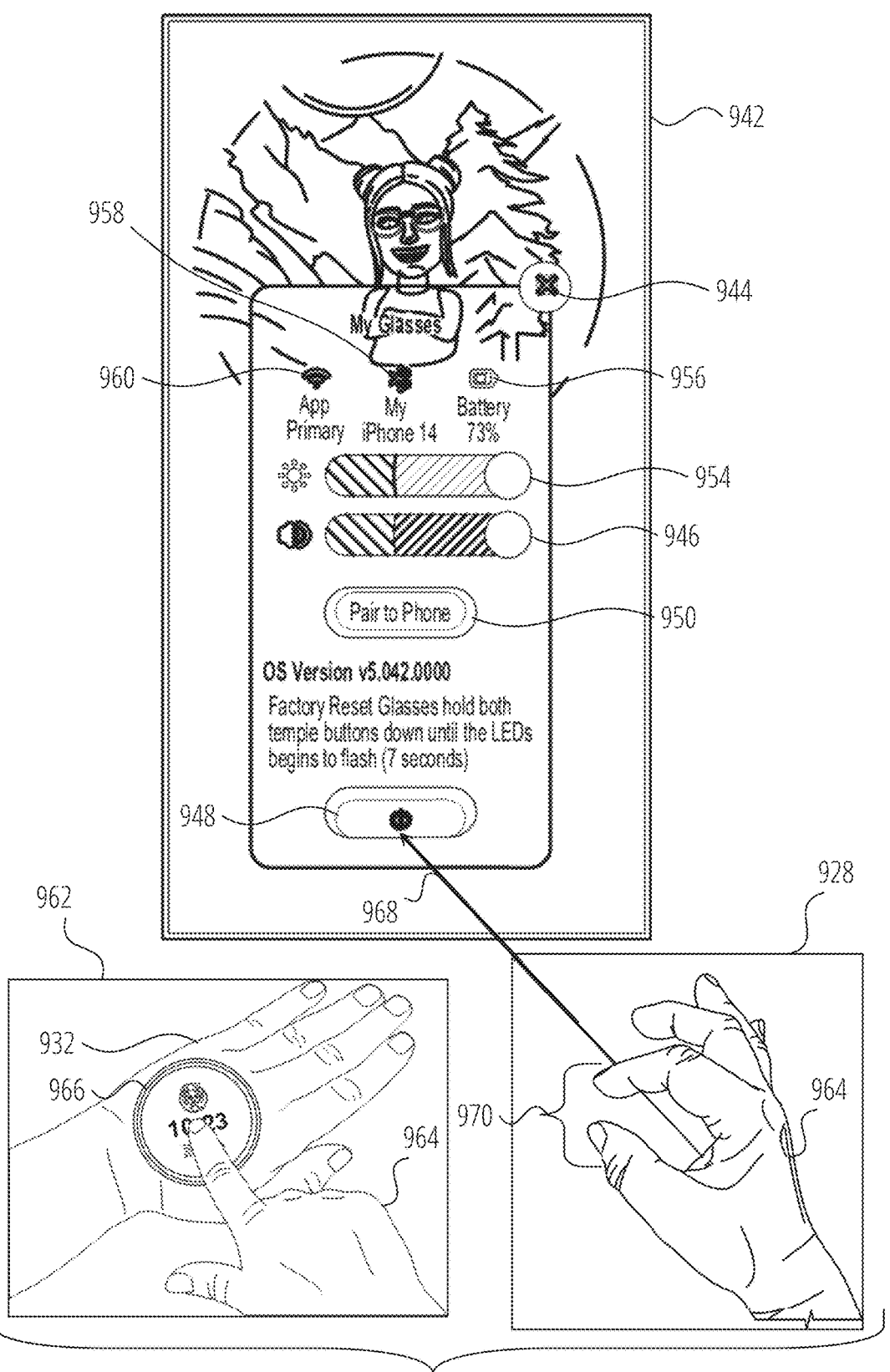
FIG. 9C illustrates use of a hand dorsal surface system control user interface in conjunction with a system function user interface, according to some examples.

FIG. 9A illustrates an example XR user interface method 900, FIG. 9B illustrates use of a palmar surface XR user interface 930 in conjunction with an application XR user interface 926, and FIG. 9C illustrates use of a hand dorsal surface XR user interface 962 in conjunction with an application XR user interface 942, according to some examples. Although the example XR user interface method 900 depicts particular sequence of operations, the sequence may be altered without departing from the scope of the present disclosure. For example, some of the operations depicted may be performed in parallel or in a different sequence that does not materially affect the function of the XR user interface method 900. In other examples, different components of an XR system 510 of FIG. 5 that implements the XR user interface method 900 may perform functions at substantially the same time or in a specific sequence.

In operation 902, in reference to FIG. 5, the XR system 510 captures 3D tracking data 538 of one or both hands 524 and 586 of a user 508 using one or more tracking sensors 520 and one or more pose sensors 548 as more fully described in reference to FIG. 5.

In loop 904, the XR system 510 continues to capture the 3D tracking data while it generates and displays various user interfaces to the user 508. By continuing to capture the 3D tracking data, the XR system 510 can provide an interactive user interface to the user 508.

In operation 906, the XR system generates, using the 3D tracking data 538, a hand-located user interface including an interactive virtual object associated with a location on a surface of the first hand.

In some examples, the hand-located XR user interface is a palmar surface XR user interface 930 of FIG. 9B as more fully described in reference to FIG. 6. The palmar surface XR user interface 930 includes one or more interactive virtual objects, such as interactive virtual object 934 interactive virtual object 936, interactive virtual object 938, and interactive virtual object 940.

In some examples, the hand-located XR user interface is a hand dorsal surface XR user interface 962 of FIG. 9C as more fully described in reference to FIG. 7. The hand dorsal surface XR user interface 962 includes one or more interactive virtual objects, such as interactive virtual object 966.

In operation 908, the XR system 510 provides the hand-located XR user interface to the user 508 as more fully described in reference to FIG. 5.

In operation 910, the XR system 510 detects using the tracking data, a hand touch on the surface of the first hand by a digit of the second hand 964 of the user 508 as more fully described in reference to FIG. 6 and FIG. 7.

In some examples, the XR system 510 detects when the user 508 interacts with the palmar surface XR user interface 930 by detecting when the user 508 touches a palmar surface of their first hand 932 at a location associated with an interactive virtual object, such as interactive virtual object 934, interactive virtual object 936, interactive virtual object 938, or interactive virtual object 940.

In some examples, the XR system 510 detects when the user 508 interacts with the hand dorsal surface XR user interface 962 by detecting when the user 508 touches a hand dorsal surface of their first hand 932 at a location associated with an interactive virtual object, such as interactive virtual object 966.

In operation 912, the XR system 510 performs an action based on the interactive virtual object associated with the location on the first hand.

In some examples, referring to FIG. 5, an action performed by the XR system 510 can be a function of a system function component 568, a system control component 574, an application of one or more applications 570, or the like.

In some examples, the XR system 510 provides an application XR user interface in conjunction with a hand-located XR user interface, such as application XR user interface 926 of FIG. 9B, application XR user interface 942 of FIG. 9C, or the like. For example, the XR system 510 uses 3D tracking data 538 of FIG. 5 to dynamically generate the application XR user interface that is overlain onto a view of the user 508 of the real world within the context of the XR user interfaces 518 of FIG. 5. The application XR user interface includes one or more interactive virtual objects, that are contextually relevant to the selection and execution of a function of an application of the application XR user interface 926. In some examples, the placement, size, and orientation of the interactive virtual objects are determined by a position and gaze direction of the user 508, ensuring that the interactive virtual objects are visible and accessible within the field of view of the user 508.

In some examples, the interactive virtual objects of the application XR user interface 926 are positioned within the system function user interface based on interaction patterns of the user 508 and environmental context. For example, if the user is looking at a specific area, related interactive virtual objects can appear in that direction to facilitate easy interaction. The XR system 510 renders the interactive virtual objects with appropriate depth and spatial accuracy, maintaining a coherent and immersive experience. The interactive virtual objects may appear fixed in space, attached to real-world surfaces, or move a spaced apart relationship with one or more of the hands of the user depending on the application.

In reference to FIG. 9B, the application XR user interface 926 includes one or more interactive virtual objects such as interactive virtual object 914, interactive virtual object 916, interactive virtual object 918, interactive virtual object 920, interactive virtual object 922, and interactive virtual object 924. The one or more interactive virtual objects are selectable by the user 508 to perform various functions of an application of the application XR user interface 926.

In some examples, the user 508 can use the palmar surface XR user interface 930 to navigate between the interactive virtual objects of the application XR user interface 926.

In some examples, the XR system 510 provides a ray cast plus pinch selection input modality 986 to the user 508. The user 508 can use the ray cast plus pinch selection input modality 986 to interact with the one or more interactive virtual objects of the application XR user interface 926 as more fully described in reference to FIG. 8. The user uses their second hand 980 to position a ray cast cursor 982 so that the ray cast cursor 982 intersects with an interactive virtual object of the application XR user interface 926 and makes a pinch gesture 984 to indicate a selection of the interactive virtual object as a selected interactive virtual object, such as interactive virtual object 972. The XR system 510 detects the pinch gesture 984 and the intersection of the ray cast cursor pinch gesture 984 with the selected interactive virtual object and determines that the user has selected the selected interactive virtual object.

In some examples, in reference to FIG. 9C, in response to detecting a hand touch input from a hand dorsal surface XR user interface 962, the XR system 510 generates an application XR user interface 942 for an application, a system function component, a system control component, or the like of the XR system 510. For example, a system function application can be used to configure the XR system 510 using one or more interactive virtual objects selectable to make changes to one or more system settings of the XR system 510. Example settings having respective interactive virtual objects include, but are not limited to, a brightness setting 954, a volume setting 946, and the like. In some examples, the application XR user interface 942 includes status display icons such as, but not limited to, a battery level system status display 960, a link system status display 958, a battery level system status display 956, and the like. In some examples, the application XR user interface 942 includes a pairing interactive virtual object 950 selectable to pair the XR system 510 to a mobile device such as, but not limited to, a smartphone or the like. In some examples, the application XR user interface 942 provides a power down interactive virtual object 948 selectable to power down the XR system 510. In some examples, the application XR user interface 942 includes an exit system function interactive virtual object 944 selectable to cause the XR system 510 to close the application XR user interface 942.

The XR system 510 provides a ray cast plus pinch selection input modality 928 to the user 508. The user 508 can use the ray cast plus pinch selection input modality 928 to interact with the one or more interactive virtual objects of the application XR user interface 942 as more fully described in reference to FIG. 8. The user uses their second hand 964 to position a ray cast cursor 968 so that the ray cast cursor 968 intersects with an interactive virtual object of the application XR user interface 942 and makes a pinch gesture 970 to indicate a selection of the interactive virtual object as a selected interactive virtual object, such as power down interactive virtual object 948. The XR system 510 detects the pinch gesture 970 and the intersection of the ray cast cursor 968 with the selected interactive virtual object and determines that the user has selected the selected interactive virtual object.

In some examples, the XR system 510 provides a Direct Manipulation of Virtual Object (DMVO) input modality to the user. The user interacts with the interactive virtual objects of an application XR user interface by making pinching or grabbing motions in the apparent location of the interactive virtual objects.

Figure 10B:
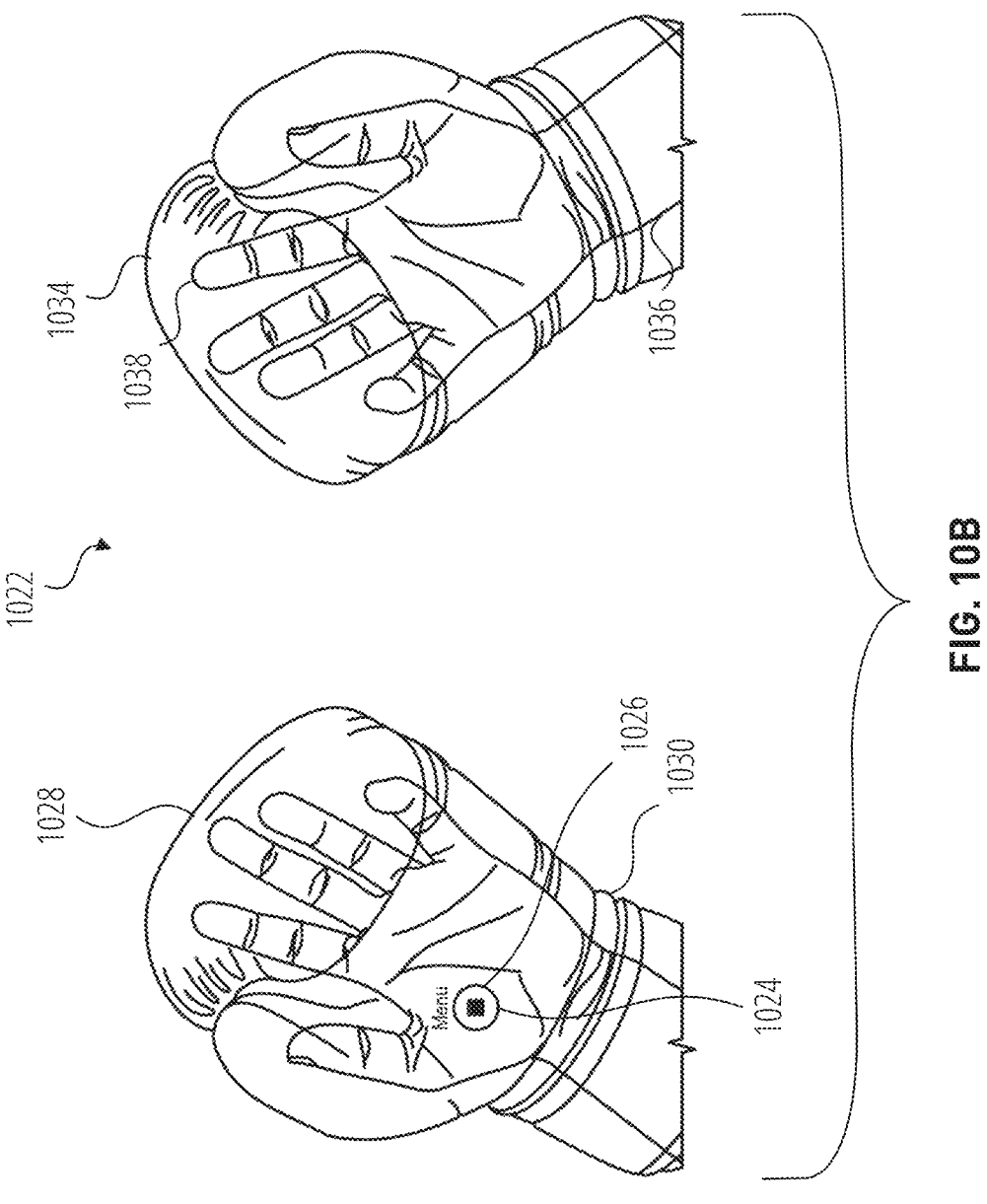
FIG. 10B illustrates another in-application system control user interface, according to some examples.

FIG. 10A illustrates an example in-application system control user interface method 1000, and FIG. 10B illustrates an in-application system control user interface 1026, according to some examples. An XR system, such as XR system 510 of FIG. 5, uses the in-application system control user interface method 1000 to provide an in-application system control user interface to a user. Although the example in-application system control user interface method 1000 depicts a particular sequence of operations, the sequence may be altered without departing from the scope of the present disclosure. For example, some of the operations depicted may be performed in parallel or in a different sequence that does not materially affect the function of the in-application system control user interface method 1000. In other examples, different components of an XR system 510 that implements the in-application system control user interface method 1000 may perform functions at substantially the same time or in a specific sequence.

In operation 1002, as described more fully in reference to FIG. 9A, an XR system 510 provides an application user interface 1022 of an application. When the application is running, the XR system 510 can use the in-application system control user interface method 1000 to provide an in-application system control user interface to a user as the user uses the application.

The application user interface is overlain onto the view of the user 508 of the real world within the context of the XR user interfaces 518 of FIG. 5. The application user interface 1022 includes one or more virtual objects that are contextually relevant to a function of the application. As an example, the application user interface 1022 illustrated is an entertainment application where virtual object 1028 and virtual object 1034 are in a form of boxing gloves. The virtual object 1028 is overlain over a first hand 1030 of the user and virtual object 1034 is overlain on a second hand 1036 of the user. The placement, size, and orientation of the virtual objects are determined by a position and gaze direction of the user 508, ensuring that the virtual objects are visible and accessible within the field of view of the user 508.

The user 508 interacts with the virtual objects of the application user interface 1022 through natural gestures such as touching, grabbing, or gesturing in mid-air. The XR system 510 recognizes these gestures using the 3D tracking data 538 and allows the user 508 to manipulate the virtual objects accordingly. Interactions can trigger various responses from the XR system 510, such as opening menus, displaying information, starting animations, or controlling virtual tools and devices.

In operation 1004, the XR system 510 generates, using the 3D tracking data 538, an in-application system control user interface 1026 including one or more interactive virtual objects such as interactive virtual object 1024 associated with respective one or more specified locations on a first hand 1030 of the user as more fully described in reference to FIG. 6. Even though the virtual object 1028 overlays the locations of the first hand 1030 where the in-application system control user interface 1026 is located, the user can still select the interactive virtual object 1024 of the in-application system control user interface 1026 using a digit 1038 of a second hand 1036 without ambiguity as detection of the selection of the interactive virtual object 1024 of the in-application system control user interface 1026 uses hand touch methodologies as described in reference to FIG. 5, FIG. 6, and FIG. 7. This allows the XR system 510 to provide an application user interface 1022 where the user can interact with virtual objects using both their first hand 1030 and their second hand 1036 and still access the in-application system control user interface 1026.

In operation 1006, the XR system 510 simultaneously provides the in-application system control user interface 1026 and the application user interface 1022 to the user. This multi-user interface configuration allows a user to interact with both the system control features and the application-specific functionalities concurrently, enhancing the user experience by enabling efficient multitasking and seamless navigation between system controls and application operations.

In operation 1008, the XR system 510 detects a hand-touch input when the user touches their first hand at a location of the interactive virtual object 1024 of the in-application system control user interface 1026 using a digit 1038 of their second hand 1036.

In operation 1010, in response to the user input through the in-application system control user interface 1026, the XR system 510 executes a system-level function using the user input. Example system-level functions include, but are not limited to:

System Level Menu Access: Provides the user with access to a comprehensive menu that includes settings, preferences, and system-wide options. This menu can be invoked through specific gestures or button presses on the user interface.

Application Exit: Allows the user to close the current application. This function is typically accessible through a dedicated exit button or gesture, ensuring that users can easily and quickly leave the application when needed.

Volume Control: Enables the user to adjust the system volume, including media playback volume and notification sounds. This can be integrated into the system menu or accessed via hardware buttons.

Brightness Adjustment: Allows the user to modify the display brightness to suit different environments and personal preferences. This function helps in enhancing visual comfort and battery efficiency.

Network Connectivity Settings: Provides options to manage Wi-Fi and Bluetooth connections. Users can connect to networks, manage network settings, and control device visibility and connectivity.

Battery Status Display: Shows the current battery level and provides information on power usage. It may also offer power-saving options to extend battery life.

Notification Management: Allows users to view, interact with, and manage notifications from various applications. This function helps in maintaining awareness of important updates without needing to exit the current application.

Accessibility Features: Offers various accessibility settings such as text size adjustment, color correction modes, and voice control, making the system usable for people with different abilities.

Security and Privacy Settings: Provides options to manage security settings, including device lock methods, permissions for applications, and data privacy controls.

Figure 11A:
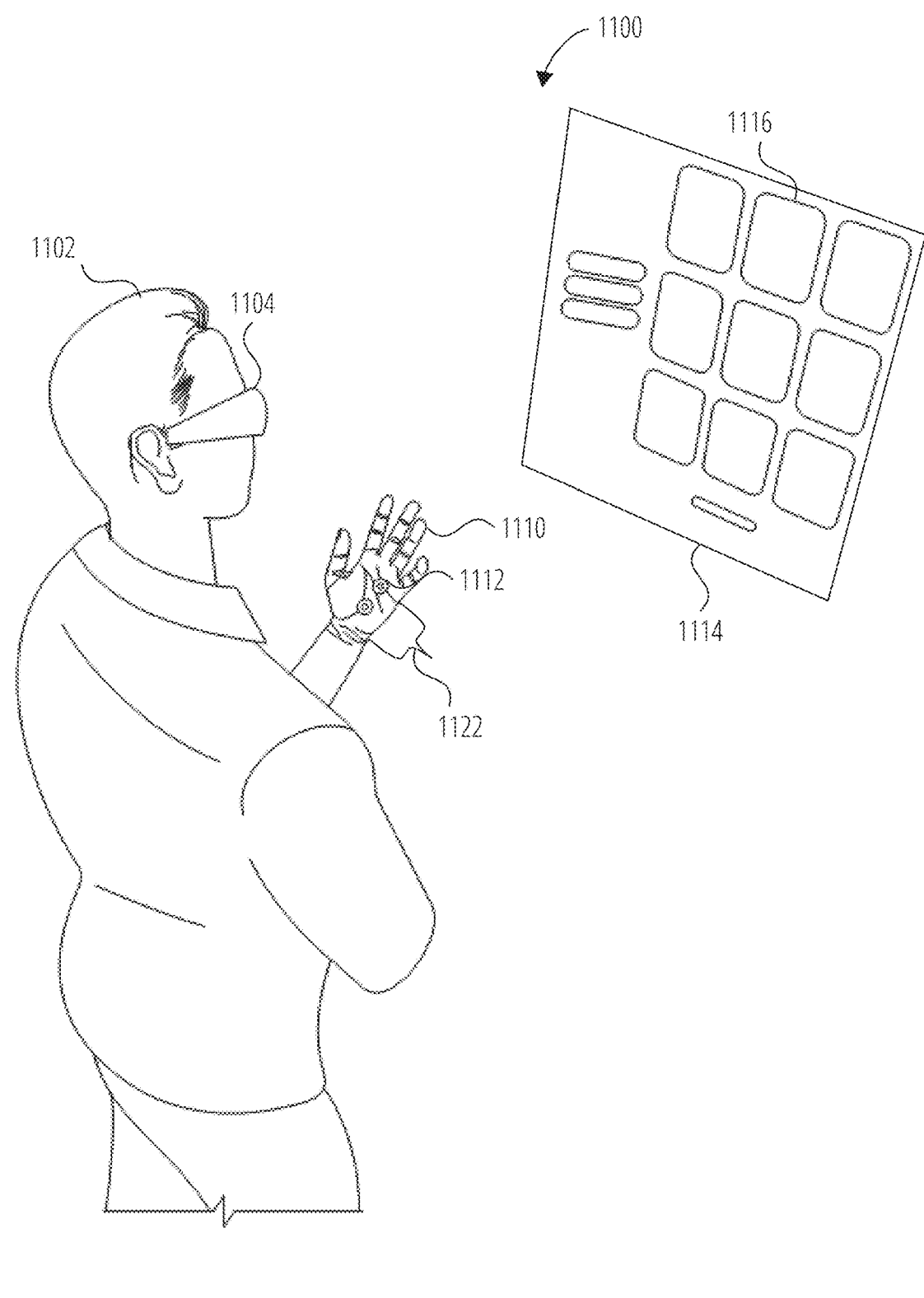
FIG. 11A illustrates a user interface for an XR system, according to some examples.
Figure 11B:
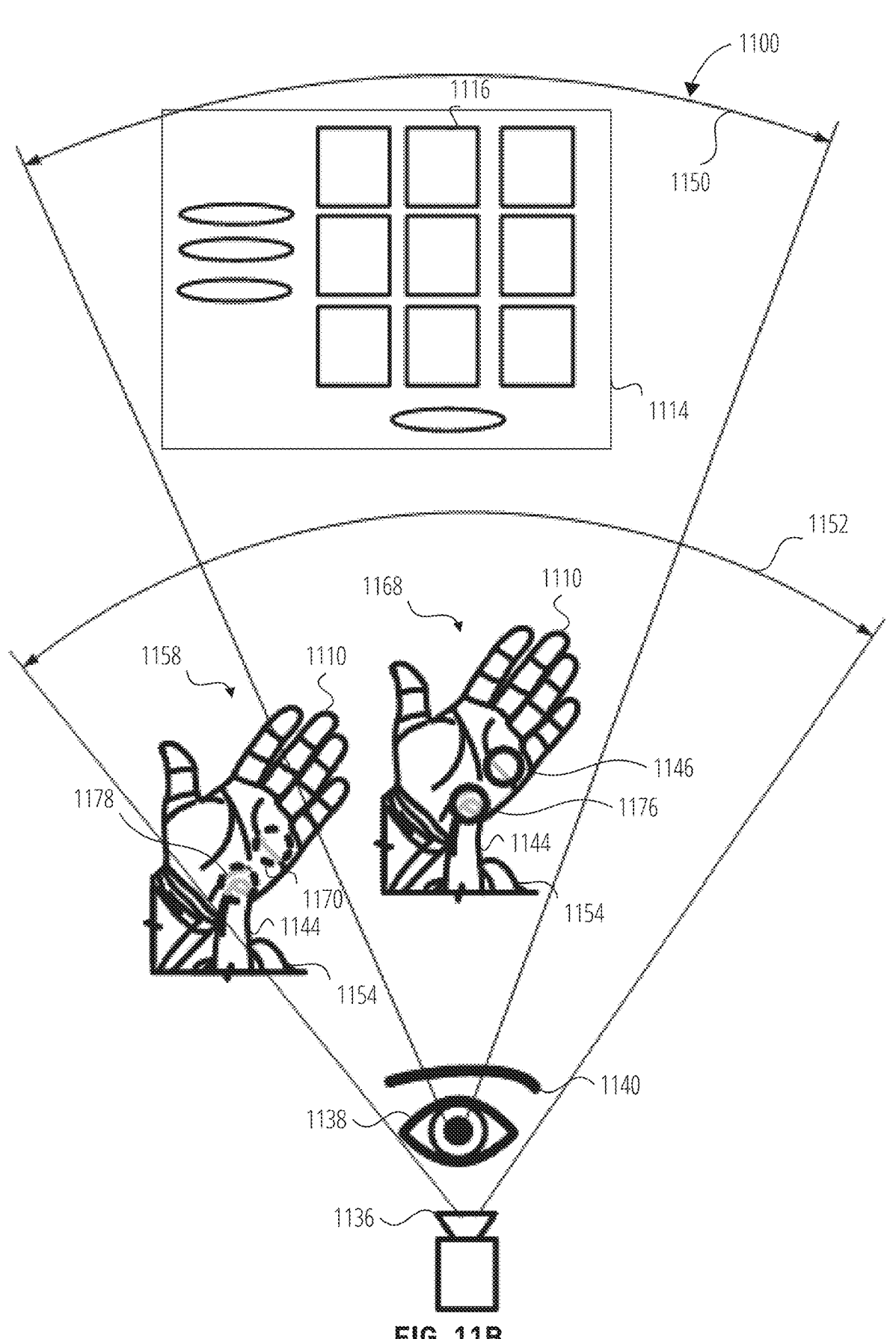
FIG. 11B illustrates a proprioceptive XR user interface, according to some examples.

FIG. 11A and FIG. 11B illustrate features of proprioceptive XR user interface, according to some examples. An XR system, such as XR system 510 of FIG. 5, uses a proprioceptive XR user interface to provide a proprioceptive user input modality to a user of the XR system. A head-wearable apparatus 1104, such as head-wearable apparatus 100 of FIG. 1A and FIG. 1B, can comprise the XR system. A user 1102 wearing the head-wearable apparatus 1104 is provided with a one or more XR user interfaces, such as XR user interface 1114 and hand-located XR user interface 1122 that are comprised of one or more respective interactive virtual objects, such as interactive virtual object 1116, and interactive virtual object 1112, as more fully described in reference to FIG. 9A, FIG. 9B, and FIG. 9C. The one or more XR user interfaces comprise one or more user input modalities such as a hand-located user input modality provided as part of hand-located XR user interface 1122 more fully described in reference to FIG. 6 and FIG. 7.

The XR system uses one or more optical elements, such as optical element 1140, to generate images of one or more interactive virtual objects of a proprioceptive XR user interface as described more fully in reference to FIG. 1A and FIG. 1B. The proprioceptive XR user interface can be a hand-located XR user interface located on a first hand 1110 of the user 1102. The user 1102 can use a digit 1144 of a second hand 1154 to interact with one or more interactive virtual objects of the hand-located XR user interface.

When the first hand 1110 is at a location 1168 within an optical element field of view 1150 of an optical element 1140, the XR system can use the optical element 1140 to provide renders of the one or more interactive virtual objects in a display, such as interactive virtual object 1146 and interactive virtual object 1176. When the first hand 1110 is located at location 1168 within the optical element field of view 1150, a user's eye 1138 can see interactive virtual object 1146 and interactive virtual object 1176 as provided by the optical element 1140. In addition, a tracking sensor 1136 can capture tracking data of the first hand 1110 and the digit 1144 of the second hand 1154 as the user interacts with interactive virtual object 1146 and interactive virtual object 1176 as described more fully in reference to FIG. 6 to FIG. 7. The tracking sensor 1136 can do so because the user positions their first hand 1110 at the location 1168 within a sensor field of view 1152 of the tracking sensor 1136.

When the first hand 1110 is positioned at a location 1158 outside of the optical element field of view 1150 but within the sensor field of view 1152, the user can still interact with the interactive virtual objects of the hand-located XR user interface even though the optical element 1140 cannot provide renders of the interactive virtual objects as they are now located outside of the optical element field of view 1150. As illustrated interactive virtual object 1170 and interactive virtual object 1178 are located outside of the optical element field of view 1150 and the optical element 1140 cannot provide renders of interactive virtual object 1178 and interactive virtual object 1170 as indicated by the broken lines of the circles representing the interactive virtual objects. However, the user 1102 can interact with interactive virtual object 1170 and interactive virtual object 1178 prospectively even though the optical element 1140 is incapable of rendering the interactive virtual objects as the first hand 1110 is still located in the sensor field of view 1152 of the tracking sensor 1136.

In some examples, a proprioceptive XR user interface can be provided to a user inside the peripheral field of view of the user and outside of an optical element field of view of an optical element of an XR system providing the proprioceptive XR user interface.

In some examples, a proprioceptive XR user interface can be provided to a user outside the peripheral field of view of the user and outside of an optical element field of view of an optical element of an XR system providing the proprioceptive XR user interface.

In some examples, a tracking sensor can be angled such that an optical axis of the tracking sensor is below an optical axis of an optical element used to display images of an interactive virtual object to a user. This allows a user to hold their hands below their line of sight when viewing or interacting with virtual objects provided by an XR system.

In some examples, a tracking sensor can be angled such that an optical axis of the tracking sensor is to one side of an optical axis of an optical element used to display images of an interactive virtual object to a user. This allows a user to hold their hands outside and to the side of their line of sight when viewing or interacting with virtual objects provided by an XR system.

In some examples, a tracking sensor can be angled such that an optical axis of the tracking sensor is above an optical axis of an optical element used to display images of an interactive virtual object to a user. This allows a user to hold their hands above their line of sight when viewing or interacting with virtual objects provided by an XR system.

In some examples, the interactive virtual objects of an XR user interface and the interactive virtual objects of a hand-located XR user interface are provided at different spatial frequencies. Spatial resolution and spatial frequency are closely related concepts in digital imaging systems. A spatial resolution refers to the number of pixels used to construct a digital image, while spatial frequency describes the level of detail or fineness captured in that image. Higher spatial resolutions allow for representing higher spatial frequencies, which correspond to finer details in the image. Conversely, lower spatial resolutions can only capture lower spatial frequencies, resulting in a loss of finer details and a more blurred or pixelated appearance. Specifically, spatial resolution is measured in pixels while spatial frequency is measured in cycles per unit distance (e.g., cycles/mm). A maximum spatial frequency an image can represent is determined by its spatial resolution according to the Nyquist criterion The highest representable spatial frequency is 1/(2*sampling interval) cycles/unit distance So a higher pixel density (smaller sampling interval) allows higher spatial frequencies to be rendered in a user interface. As visual acuity is less in the peripheral field of view than in the central field of view, this allows the user to be able to focus on the XR user interface 1114 and still be able to determine the different interactive virtual objects of the hand-located XR user interface. For example, the interactive virtual objects of the XR user interface 1114 are provided at a first spatial frequency below a specified threshold spatial frequency value while the interactive virtual objects of the hand-located XR user interface are provided at a second spatial frequency that meets or exceeds the specified threshold spatial frequency value.

For example, a binocular field of view is an area that can be seen by both eyes of a user simultaneously, covering approximately 120° horizontally and 130° vertically. The binocular field of view allows for stereoscopic depth perception and is important for tasks requiring fine visual detail. A peripheral field of view refers to outer portions of the visual field, outside the area of central vision. The peripheral field of view typically extends up to 100° temporally, 60° nasally, 60° superiorly, and 70° inferiorly for each eye. Visual acuity and color perception are reduced in the peripheral field of view. A central field of view is a region of sharpest vision, corresponding to the fovea centralis of the retina. The central field of view typically covers 2-3° of the visual field and is used for tasks like reading. A foveal field of view typically covers 1-2° of the central visual field and provides the highest visual acuity. By displaying the hand-located XR user interface in a spaced apart and separate relationship with the XR user interface 1114, the system function user interface can be located in the central field of view of the user while the hand-located XR user interface can be located in the peripheral field of view of the user.

In some examples, an XR system, such XR system 510 of FIG. 5, can provide the hand-located XR user interface when the hand-located XR user interface is not in the field of view of a user. For example, one or more tracking sensors 520 of FIG. 5 can include one or more cameras that have a wide field of view and can capture images of the hands of the user even when the hands of the user are out of the field of view of the user. The XR system 510 uses tracking data 522 and pose data 550 to continuously update the XR user interface object model 526 of FIG. 5 with a current location and position of the hands of the user and the interactive virtual objects included in the hand-located XR user interface even though the user interface engine 506 determines that the interactive virtual objects are outside of the field of view of the user and therefore are not rendered and provided to the user as part of the XR user interfaces 518 of FIG. 5. The user can use proprioception to touch portions of the palmar surface or hand dorsal surface overlain by the system control user interface at the locations that correspond to the interactive virtual objects. The one or more tracking sensors 520 capture tracking data 522 that the hand touch detection pipeline 554 of FIG. 5 can process to determine that the user is touching their first hand having the overlain system control user interface with their second hand. The user interface engine 506 receives the hand touch data 564 of FIG. 5 and the 3D tracking data 538 of FIG. 5 and uses the hand touch data 564 and the 3D tracking data 538 to determine that the user 508 is touching their first hand with a digit of their second hand at a location that corresponds to an interactive virtual object of the hand-located XR user interface. In this manner, the XR system 510 can receive inputs from the user without the user being able to see the hand-located XR user interface in the field of view of the user.

In some examples, XR user interface 1114 is provided at a location that is movable within the field of view of the user where the location is relative to a location of the first hand 1110. When the XR system 510 detects a movement of the first hand by the user, the XR system 510 updates the location of the XR user interface 1114 relative to the location of the first hand 1110. This allows the user to move the XR user interface 1114 by moving their first hand 1110.

In some examples, XR user interface 1114 is provided at a location that is movable within the field of view of the user where the location is relative to a pose of the user. When the XR system 510 detects a movement of the user, the XR system 510 updates the location of the XR user interface 1114 relative to the pose of the user. This allows the XR system to move the XR user interface 1114 so that it is constantly provided to the user in a fixed relative position to the user.

In some examples, the proprioception XR user interface 1100 may include one or more additional use input modalities to assist the user 1102 in interacting with the XR user interface 1114 such as, but not limited to, a ray cast and pinch user input modality 800 as more fully described in reference to FIG. 8.

Machine-Learning Pipeline

FIG. 12B is a flowchart depicting a machine-learning pipeline 1216, according to some examples. The machine-learning pipeline 1216 can be used to generate a trained machine-learning model 1218 such as, but not limited to ROI detector model 509 of FIG. 5, tracking model 544 of FIG. 5, 3D coordinate generator model 546 of FIG. FIG. 5, cropping model 562 of FIG. 5, hand touch model 560 of FIG. 5, and the like, to perform operations associated with determining user inputs into an XR system, such as XR system 510 of FIG. 5.

Machine learning can involve using computer algorithms to automatically learn patterns and relationships in data, potentially without the need for explicit programming.

Machine learning algorithms can be divided into three main categories: supervised learning, unsupervised learning, and reinforcement learning.

Supervised learning involves training a model using labeled data to predict an output for new, unseen inputs. Examples of supervised learning algorithms include linear regression, decision trees, and neural networks.

Unsupervised learning involves training a model on unlabeled data to find hidden patterns and relationships in the data. Examples of unsupervised learning algorithms include clustering, principal component analysis, and generative models like autoencoders.

Reinforcement learning involves training a model to make decisions in a dynamic environment by receiving feedback in the form of rewards or penalties. Examples of reinforcement learning algorithms include Q-learning and policy gradient methods.

Examples of specific machine learning algorithms that can be deployed, according to some examples, include logistic regression, which is a type of supervised learning algorithm used for binary classification tasks. Logistic regression models the probability of a binary response variable based on one or more predictor variables. Another example type of machine learning algorithm is Naïve Bayes, which is another supervised learning algorithm used for classification tasks. Naïve Bayes is based on Bayes' theorem and assumes that the predictor variables are independent of each other. Random Forest is another type of supervised learning algorithm used for classification, regression, and other tasks. Random Forest builds a collection of decision trees and combines their outputs to make predictions. Further examples include neural networks, which consist of interconnected layers of nodes (or neurons) that process information and make predictions based on the input data. Matrix factorization is another type of machine learning algorithm used for recommender systems and other tasks. Matrix factorization decomposes a matrix into two or more matrices to uncover hidden patterns or relationships in the data. Support Vector Machines (SVM) are a type of supervised learning algorithm used for classification, regression, and other tasks. SVM finds a hyperplane that separates the different classes in the data. Other types of machine learning algorithms include decision trees, k-nearest neighbors, clustering algorithms, and deep learning algorithms such as convolutional neural networks (CNN), recurrent neural networks (RNN), and transformer models. The choice of algorithm depends on the nature of the data, the complexity of the problem, and the performance requirements of the application.

The performance of machine learning models is typically evaluated on a separate test set of data that was not used during training to ensure that the model can generalize to new, unseen data.

Although several specific examples of machine learning algorithms are discussed herein, the principles discussed herein can be applied to other machine learning algorithms as well. Deep learning algorithms such as convolutional neural networks, recurrent neural networks, and transformers, as well as more traditional machine learning algorithms like decision trees, random forests, and gradient boosting can be used in various machine learning applications.

Three example types of problems in machine learning are classification problems, regression problems, and generation problems. Classification problems, also referred to as categorization problems, aim at classifying items into one of several category values (for example, is this object an apple or an orange?). Regression algorithms aim at quantifying some items (for example, by providing a value that is a real number). Generation algorithms aim at producing new examples that are similar to examples provided for training. For instance, a text generation algorithm is trained on many text documents and is configured to generate new coherent text with similar statistical properties as the training data.

Generating a trained machine-learning model 1218 can include multiple phases that form part of the machine-learning pipeline 1216, including for example the following phases illustrated in FIG. 12A:

Data collection and preprocessing 1202: This phase can include acquiring and cleaning data to ensure that it is suitable for use in the machine learning model. This phase can also include removing duplicates, handling missing values, and converting data into a suitable format.

Feature engineering 1204: This phase can include selecting and transforming the training data 1222 to create features that are useful for predicting the target variable. Feature engineering can include (1) receiving features 1224 (e.g., as structured or labeled data in supervised learning) and/or (2) identifying features 1224 (e.g., unstructured or unlabeled data for unsupervised learning) in training data 1222.

Model selection and training 1206: This phase can include selecting an appropriate machine learning algorithm and training it on the preprocessed data. This phase can further involve splitting the data into training and testing sets, using cross-validation to evaluate the model, and tuning hyperparameters to improve performance.

Model evaluation 1208: This phase can include evaluating the performance of a trained model (e.g., the trained machine-learning model 1218) on a separate testing dataset. This phase can help determine if the model is overfitting or underfitting and determine whether the model is suitable for deployment.

Prediction 1210: This phase involves using a trained model (e.g., trained machine-learning model 1218) to generate predictions on new, unseen data.

Validation, refinement or retraining 1212: This phase can include updating a model based on feedback generated from the prediction phase, such as new data or user feedback.

Deployment 1214: This phase can include integrating the trained model (e.g., the trained machine-learning model 1218) into a more extensive system or application, such as a web service, mobile app, or IoT device. This phase can involve setting up APIs, building a user interface, and ensuring that the model is scalable and can handle large volumes of data.

FIG. 12B illustrates further details of two example phases, namely a training phase 1220 (e.g., part of the model selection and trainings 1206) and a prediction phase 1226 (part of prediction 1210). Prior to the training phase 1220, feature engineering 1204 is used to identify features 1224. This can include identifying informative, discriminating, and independent features for effectively operating the trained machine-learning model 1218 in pattern recognition, classification, and regression. In some examples, the training data 1222 includes labeled data, known for pre-identified features 1224 and one or more outcomes. Each of the features 1224 can be a variable or attribute, such as an individual measurable property of a process, article, system, or phenomenon represented by a data set (e.g., the training data 1222). Features 1224 can also be of different types, such as numeric features, strings, and graphs, and can include one or more of content 1228, concepts 1230, attributes 1232, historical data 1234, and/or user data 1236, merely for example.

In training phase 1220, the machine-learning pipeline 1216 uses the training data 1222 to find correlations among the features 1224 that affect a predicted outcome or prediction/inference data 1238.

With the training data 1222 and the identified features 1224, the trained machine-learning model 1218 is trained during the training phase 1220 during machine-learning program training 1240. The machine-learning program training 1240 appraises values of the features 1224 as they correlate to the training data 1222. The result of the training is the trained machine-learning model 1218 (e.g., a trained or learned model).

Further, the training phase 1220 can involve machine learning, in which the training data 1222 is structured (e.g., labeled during preprocessing operations). The trained machine-learning model 1218 implements a neural network 1242 capable of performing, for example, classification and clustering operations. In other examples, the training phase 1220 can involve deep learning, in which the training data 1222 is unstructured, and the trained machine-learning model 1218 implements a deep neural network 1242 that can perform both feature extraction and classification/clustering operations.

In some examples, a neural network 1242 can be generated during the training phase 1220, and implemented within the trained machine-learning model 1218. The neural network 1242 includes a hierarchical (e.g., layered) organization of neurons, with each layer consisting of multiple neurons or nodes. Neurons in the input layer receive the input data, while neurons in the output layer produce the final output of the network. Between the input and output layers, there can be one or more hidden layers, each consisting of multiple neurons.

Each neuron in the neural network 1242 operationally computes a function, such as an activation function, which takes as input the weighted sum of the outputs of the neurons in the previous layer, as well as a bias term. The output of this function is then passed as input to the neurons in the next layer. If the output of the activation function exceeds a certain threshold, an output is communicated from that neuron (e.g., transmitting neuron) to a connected neuron (e.g., receiving neuron) in successive layers. The connections between neurons have associated weights, which define the influence of the input from a transmitting neuron to a receiving neuron. During the training phase, these weights are adjusted by the learning algorithm to optimize the performance of the network. Different types of neural networks can use different activation functions and learning algorithms, affecting their performance on different tasks. The layered organization of neurons and the use of activation functions and weights enable neural networks to model complex relationships between inputs and outputs, and to generalize to new inputs that were not seen during training.

In some examples, the neural network 1242 can also be one of several different types of neural networks, such as a single-layer feed-forward network, a Multilayer Perceptron (MLP), an Artificial Neural Network (ANN), a Recurrent Neural Network (RNN), a Long Short-Term Memory Network (LSTM), a Bidirectional Neural Network, a symmetrically connected neural network, a Deep Belief Network (DBN), a Convolutional Neural Network (CNN), a Generative Adversarial Network (GAN), an Autoencoder Neural Network (AE), a Restricted Boltzmann Machine (RBM), a Hopfield Network, a Self-Organizing Map (SOM), a Radial Basis Function Network (RBFN), a Spiking Neural Network (SNN), a Liquid State Machine (LSM), an Echo State Network (ESN), a Neural Turing Machine (NTM), or a Transformer Network, merely for example.

In addition to the training phase 1220, a validation phase can be performed on a separate dataset known as the validation dataset. The validation dataset is used to tune the hyperparameters of a model, such as the learning rate and the regularization parameter. The hyperparameters are adjusted to improve the model's performance on the validation dataset.

Once a model is fully trained and validated, in a testing phase, the model can be tested on a new dataset. The testing dataset is used to evaluate the model's performance and ensure that the model has not overfitted the training data.

In prediction phase 1226, the trained machine-learning model 1218 uses the features 1224 for analyzing inference data 1244 to generate inferences, outcomes, or predictions, as examples of a prediction/inference data 1238. For example, during prediction phase 1226, the trained machine-learning model 1218 generates an output. Inference data 1244 is provided as an input to the trained machine-learning model 1218, and the trained machine-learning model 1218 generates the prediction/inference data 1238 as output, responsive to receipt of the inference data 1244.

In some examples, the trained machine-learning model 1218 can be a generative AI model. Generative AI is a term that can refer to any type of artificial intelligence that can create new content from training data 1222. For example, generative AI can produce text, images, video, audio, code, or synthetic data similar to the original data but not identical. In cases where the trained machine-learning model 1218 is a generative AI, inference data 1244 can include text, audio, image, video, numeric, or media content prompts and the output prediction/inference data 1238 can include text, images, video, audio, code, or synthetic data.

Some of the techniques that can be used in generative AI are:

Convolutional Neural Networks (CNNs): CNNs can be used for image recognition and computer vision tasks. CNNs can, for example, be designed to extract features from images by using filters or kernels that scan the input image and highlight important patterns.

Recurrent Neural Networks (RNNs): RNNs can be used for processing sequential data, such as speech, text, and time series data, for example. RNNs employ feedback loops that allow them to capture temporal dependencies and remember past inputs.

Generative adversarial networks (GANs): GANs can include two neural networks: a generator and a discriminator. The generator network attempts to create realistic content that can "fool" the discriminator network, while the discriminator network attempts to distinguish between real and fake content. The generator and discriminator networks compete with each other and improve over time.

Variational autoencoders (VAEs): VAEs can encode input data into a latent space (e.g., a compressed representation) and then decode it back into output data. The latent space can be manipulated to generate new variations of the output data. VAEs can use self-attention mechanisms to process input data, allowing them to handle long text sequences and capture complex dependencies.

Transformer models: Transformer models can use attention mechanisms to learn the relationships between different parts of input data (such as words or pixels)

and generate output data based on these relationships. Transformer models can handle sequential data, such as text or speech, as well as non-sequential data, such as images or code.

Figure 13:
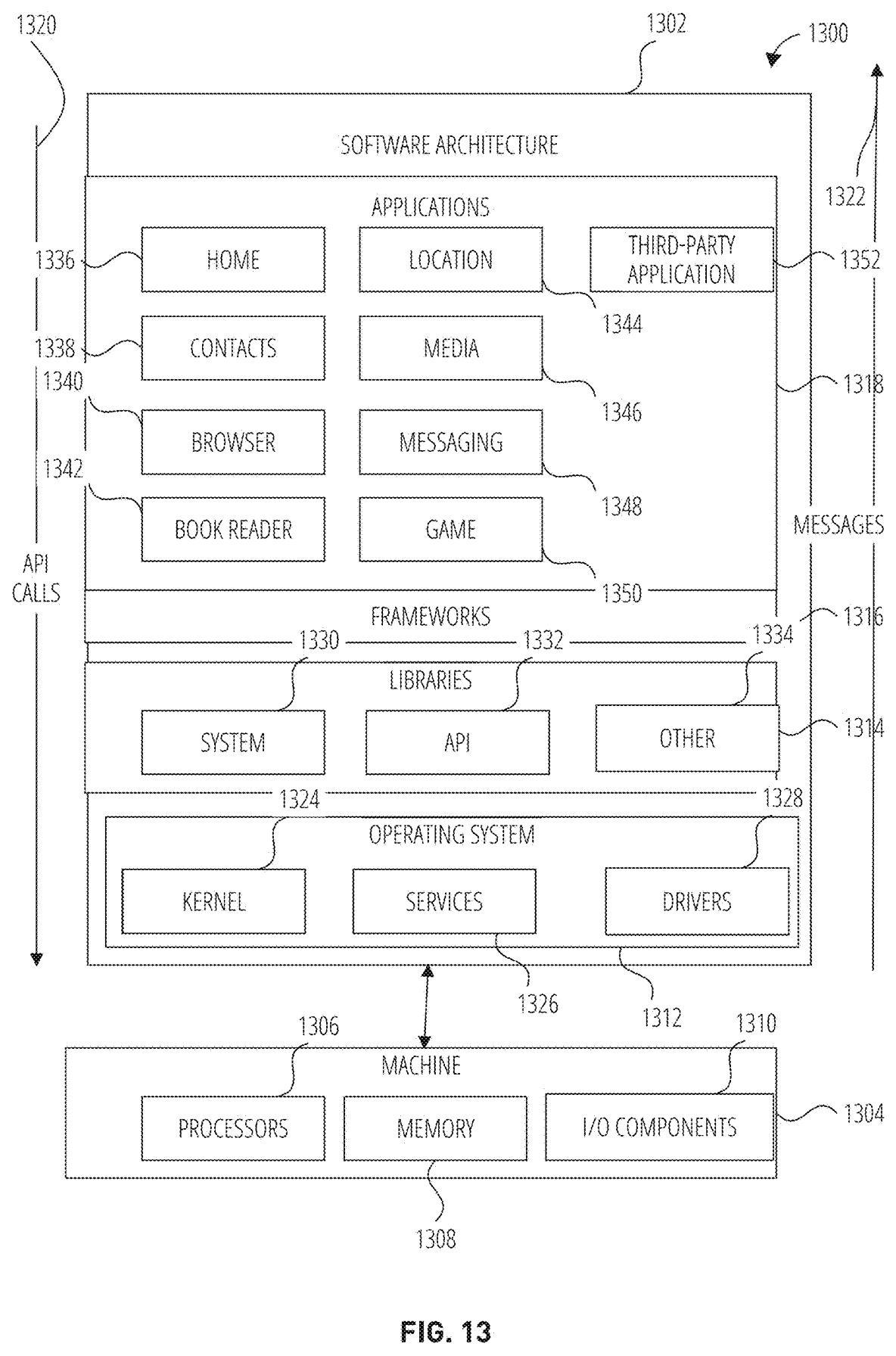

FIG. 13 is a block diagram 1300 illustrating a software architecture 1302, which can be installed on any one or more of the devices described herein. The software architecture 1302 is supported by hardware such as a machine 1304 that includes processors 1306, memory 1308, and I/O components 1310. In this example, the software architecture 1302 can be conceptualized as a stack of layers, where each layer provides a particular functionality. The software architecture 1302 includes layers such as an operating system 1312, libraries 1314, frameworks 1316, and applications 1318. Operationally, the applications 1318 invoke API calls 1320 through the software stack and receive messages 1322 in response to the API calls 1320.

The operating system 1312 manages hardware resources and provides common services. The operating system 1312 includes, for example, a kernel 1324, services 1326, and drivers 1328. The kernel 1324 acts as an abstraction layer between the hardware and the other software layers. For example, the kernel 1324 provides memory management, processor management (e.g., scheduling), component management, networking, and security settings, among other functionalities. The services 1326 can provide other common services for the other software layers. The drivers 1328 are responsible for controlling or interfacing with the underlying hardware. For instance, the drivers 1328 can include display drivers, camera drivers, BLUETOOTH® or BLUETOOTH® Low Energy drivers, flash memory drivers, serial communication drivers (e.g., USB drivers), WI-FI® drivers, audio drivers, power management drivers, and so forth.

The libraries 1314 provide a common low-level infrastructure used by the applications 1318. The libraries 1314 can include system libraries 1330 (e.g., C standard library) that provide functions such as memory allocation functions, string manipulation functions, mathematical functions, and the like. In addition, the libraries 1314 can include API libraries 1332 such as media libraries (e.g., libraries to support presentation and manipulation of various media formats such as Moving Picture Experts Group-4 (MPEG4), Advanced Video Coding (H.264 or AVC), Moving Picture Experts Group Layer-3 (MP3), Advanced Audio Coding (AAC), Adaptive Multi-Rate (AMR) audio codec, Joint Photographic Experts Group (JPEG or JPG), or Portable Network Graphics (PNG)), graphics libraries (e.g., an OpenGL framework used to render in two dimensions (2D) and three dimensions (3D) in a graphic content on a display), database libraries (e.g., SQLite to provide various relational database functions), web libraries (e.g., WebKit to provide web browsing functionality), and the like. The libraries 1314 can also include a wide variety of other libraries 1334 to provide many other APIs to the applications 1318.

The frameworks 1316 provide a common high-level infrastructure that is used by the applications 1318. For example, the frameworks 1316 provide various graphical user interface (GUI) functions, high-level resource management, and high-level location services. The frameworks 1316 can provide a broad spectrum of other APIs that can be used by the applications 1318, some of which can be specific to a particular operating system or platform.

In an example, the applications 1318 can include a home application 1336, a contacts application 1338, a browser application 1340, a book reader application 1342, a location application 1344, a media application 1346, a messaging application 1348, a game application 1350, and a broad assortment of other applications such as a third-party application 1352. The applications 1318 are programs that execute functions defined in the programs. Various programming languages can be employed to create one or more of the applications 1318, structured in a variety of manners, such as object-oriented programming languages (e.g., Objective-C, Java, or C++) or procedural programming languages (e.g., C or assembly language). In a specific example, the third-party application 1352 (e.g., an application developed using the ANDROID™ or IOS™ software development kit (SDK) by an entity other than the vendor of a platform) can be mobile software running on a mobile operating system such as IOS™, ANDROID™, WIN-DOWS® Phone, or another mobile operating system. In this example, the third-party application 1352 can invoke the API calls 1320 provided by the operating system 1312 to facilitate functionalities described herein.

Described implementations of the subject matter can include one or more features, alone or in combination as illustrated below by way of example:

Example 1 is a machine-implemented method, comprising: capturing, using one or more sensors of an eXtended Reality (XR) system, tracking data of a first hand and a second hand of a user; and while continuously capturing the tracking data, performing operations comprising: generating, using the tracking data, a hand-located user interface including an interactive virtual object associated with a location on a surface of the first hand; providing the hand-located user interface to the user; detecting, using the tracking data, a hand touch on the surface of the first hand by a digit of the second hand; and performing an action by the XR system based on the interactive virtual object associated with the location on the first hand.

In Example 2, the subject matter of Example 1 includes, wherein the surface of the first hand is a palmar surface.

In Example 3, the subject matter of any of Examples 1-2 includes, wherein the location is a thenar eminence of the first hand.

In Example 4, the subject matter of any of Examples 2-3 includes, wherein the location is a hypothenar eminence of the first hand.

In Example 5, the subject matter of any of Examples 2-4 includes, wherein the location is an interdigital space of the first hand.

In Example 6, the subject matter of any of Examples 1-5 includes, wherein the surface of the first hand is a hand dorsal surface.

In Example 7, the subject matter of any of Examples 1-6 includes, wherein the XR user interface is provided to the user outside of an optical element field of view of one or more optical elements of the XR system.

In Example 8, the subject matter of any of Examples 1-7 includes, wherein the XR system is a head-wearable apparatus.

Example 9 is at least one machine-readable medium including instructions that, when executed by processing circuitry, cause the processing circuitry to perform operations to implement any of Examples 1-8.

Example 10 is an apparatus comprising means to implement any of Examples 1-8.

Example 11 is a system to implement any of Examples 1-8.

Example 12 is a method to implement any of Examples 1-8.

The various features, operations, or processes described herein can be used independently of one another, or can be combined in various ways. All possible combinations and sub-combinations are intended to fall within the scope of this disclosure. In addition, certain method or process blocks can be omitted in some implementations.

Although some examples, e.g., those depicted in the drawings, include a particular sequence of operations, the sequence can be altered without departing from the scope of the present disclosure. For example, some of the operations depicted can be performed in parallel or in a different sequence that does not materially affect the functions as described in the examples. In other examples, different components of an example device or system that implements an example method can perform functions at substantially the same time or in a specific sequence.

Changes and modifications can be made to the disclosed examples without departing from the scope of the present disclosure. These and other changes or modifications are intended to be included within the scope of the present disclosure, as expressed in the appended claims.

Term Examples

As used in this disclosure, phrases of the form "at least one of an A, a B, or a C," "at least one of A, B, or C," "at least one of A, B, and C," and the like, should be interpreted to select at least one from the group that comprises "A, B, and C." Unless explicitly stated otherwise in connection with a particular instance in this disclosure, this manner of phrasing does not mean "at least one of A, at least one of B, and at least one of C." As used in this disclosure, the example "at least one of an A, a B, or a C," would cover any of the following selections: {A}, {B}, {C}, {A, B}, {A, C}, {B, C}, and {A, B, C}.

Unless the context clearly requires otherwise, throughout the description and the claims, the words "comprise," "comprising," and the like are to be construed in an inclusive sense, as opposed to an exclusive or exhaustive sense, e.g., in the sense of "including, but not limited to."

As used herein, the terms "connected," "coupled," or any variant thereof means any connection or coupling, either direct or indirect, between two or more elements; the coupling or connection between the elements can be physical, logical, or a combination thereof.

Additionally, the words "herein," "above," "below," and words of similar import, when used in this application, refer to this application as a whole and not to any portions of this application. Where the context permits, words using the singular or plural number can also include the plural or singular number respectively.

The word "or" in reference to a list of two or more items, covers all the following interpretations of the word: any one of the items in the list, all the items in the list, and any combination of the items in the list. Likewise, the term "and/or" in reference to a list of two or more items, covers all the following interpretations of the word: any one of the items in the list, all the items in the list, and any combination of the items in the list.

"Carrier signal" can include, for example, any intangible medium that can store, encoding, or carrying instructions for execution by the machine and includes digital or analog communications signals or other intangible media to facilitate communication of such instructions. Instructions can be transmitted or received over a network using a transmission medium via a network interface device.

"Client device" can include, for example, any machine that interfaces to a network to obtain resources from one or more server systems or other client devices. A client device can be, but is not limited to, a mobile phone, desktop computer, laptop, portable digital assistants (PDAs), smartphones, tablets, ultrabooks, netbooks, laptops, multi-processor systems, microprocessor-based or programmable consumer electronics, game consoles, set-top boxes, or any other communication device that a user can use to access a network.

"Component" can include, for example, a device, physical entity, or logic having boundaries defined by function or subroutine calls, branch points, APIs, or other technologies that provide for the partitioning or modularization of particular processing or control functions. Components can be combined via their interfaces with other components to carry out a machine process. A component can be a packaged functional hardware unit designed for use with other components and a part of a program that usually performs a particular function of related functions. Components can constitute either software components (e.g., code embodied on a machine-readable medium) or hardware components. A "hardware component" is a tangible unit capable of performing certain operations and can be configured or arranged in a certain physical manner. In various examples, one or more computer systems (e.g., a standalone computer system, a client computer system, or a server computer system) or one or more hardware components of a computer system (e.g., a processor or a group of processors) can be configured by software (e.g., an application or application portion) as a hardware component that operates to perform certain operations as described herein. A hardware component can also be implemented mechanically, electronically, or any suitable combination thereof. For example, a hardware component can include dedicated circuitry or logic that is permanently configured to perform certain operations. A hardware component can be a special-purpose processor, such as a field-programmable gate array (FPGA) or an application-specific integrated circuit (ASIC). A hardware component can also include programmable logic or circuitry that is temporarily configured by software to perform certain operations. For example, a hardware component can include software executed by a general-purpose processor or other programmable processors. Once configured by such software, hardware components become specific machines (or specific components of a machine) uniquely tailored to perform the configured functions and are no longer general-purpose processors. It will be appreciated that the decision to implement a hardware component mechanically, in dedicated and permanently configured circuitry, or in temporarily configured circuitry (e.g., configured by software), can be driven by cost and time considerations. Accordingly, the phrase "hardware component" (or "hardware-implemented component") should be understood to encompass a tangible entity, be that an entity that is physically constructed, permanently configured (e.g., hardwired), or temporarily configured (e.g., programmed) to operate in a certain manner or to perform certain operations described herein. Considering examples in which hardware components are temporarily configured (e.g., programmed), each of the hardware components need not be configured or instantiated at any one instance in time. For example, where a hardware component comprises a general-purpose processor configured by software to become a special-purpose processor, the general-purpose processor can be configured as respectively different special-purpose processors (e.g., comprising different hardware components) at different times. Software accordingly configures a particular processor or processors, for example, to constitute a particular hardware component at one instance of time and to constitute a different hardware component at a different instance of time. Hardware components can provide information to, and receive information from, other hardware components. Accordingly, the described hardware components can be regarded as being communicatively coupled. Where multiple hardware components exist contemporaneously, communications can be achieved through signal transmission (e.g., over appropriate circuits and buses) between or among two or more of the hardware components. In examples in which multiple hardware components are configured or instantiated at different times, communications between such hardware components can be achieved, for example, through the storage and retrieval of information in memory structures to which the multiple hardware components have access. For example, one hardware component can perform an operation and store the output of that operation in a memory device to which it is communicatively coupled. A further hardware component can then, at a later time, access the memory device to retrieve and process the stored output. Hardware components can also initiate communications with input or output devices, and can operate on a resource (e.g., a collection of information). The various operations of example methods described herein can be performed, at least partially, by one or more processors that are temporarily configured (e.g., by software) or permanently configured to perform the relevant operations. Whether temporarily or permanently configured, such processors can constitute processor-implemented components that operate to perform one or more operations or functions described herein. As used herein, "processor-implemented component" can refer to a hardware component implemented using one or more processors. Similarly, the methods described herein can be at least partially processor-implemented, with a particular processor or processors being an example of hardware. For example, at least some of the operations of a method can be performed by one or more processors or processor-implemented components. Moreover, the one or more processors can also operate to support performance of the relevant operations in a "cloud computing" environment or as a "software as a service" (SaaS). For example, at least some of the operations can be performed by a group of computers (as examples of machines including processors), with these operations being accessible via a network (e.g., the Internet) and via one or more appropriate interfaces (e.g., an API). The performance of certain of the operations can be distributed among the processors, not only residing within a single machine, but deployed across a number of machines. In some examples, the processors or processor-implemented components can be located in a single geographic location (e.g., within a home environment, an office environment, or a server farm). In other examples, the processors or processor-implemented components can be distributed across a number of geographic locations.

"Computer-readable medium" can include, for example, both machine-storage media and signal media. Thus, the terms include both storage devices/media and carrier waves/modulated data signals. The terms "machine-readable medium," "computer-readable medium" and "device-readable medium" mean the same thing and can be used interchangeably in this disclosure.

"Machine-storage medium" can include, for example, a single or multiple storage devices and media (e.g., a centralized or distributed database, and associated caches and servers) that store executable instructions, routines, and data. The term shall accordingly be taken to include, but not be limited to, solid-state memories, and optical and magnetic media, including memory internal or external to processors.

Specific examples of machine-storage media, computer-storage media, and device-storage media include non-volatile memory, including by way of example semiconductor memory devices, e.g., erasable programmable read-only memory (EPROM), electrically erasable programmable read-only memory (EEPROM), Field-Programmable Gate Arrays (FPGA), flash memory devices, Solid State Drives (SSD), and Non-Volatile Memory Express (NVMe) devices; magnetic disks such as internal hard disks and removable disks; magneto-optical disks; and CD-ROM, DVD-ROM, Blu-ray Discs, and Ultra HD Blu-ray discs. In addition, machine-storage medium can also refer to cloud storage services, Network Attached Storage (NAS), Storage Area Networks (SAN), and object storage devices. The terms "machine-storage medium," "device-storage medium," "computer-storage medium" mean the same thing and can be used interchangeably in this disclosure. The terms "machine-storage media," "computer-storage media," and "device-storage media" specifically exclude carrier waves, modulated data signals, and other such media, at least some of which are covered under the term "signal medium."

"Network" can include, for example, one or more portions of a network that can be an ad hoc network, an intranet, an extranet, a Virtual Private Network (VPN), a Local Area Network (LAN), a Wireless LAN (WLAN), a Wide Area Network (WAN), a Wireless WAN (WWAN), a Metropolitan Area Network (MAN), the Internet, a portion of the Internet, a portion of the Public Switched Telephone Network (PSTN), a Voice over IP (VOIP) network, a cellular telephone network, a 5GTM network, a wireless network, a Wi-Fi® network, a Wi-Fi 6® network, a Li-Fi network, a Zigbee® network, a Bluetooth® network, another type of network, or a combination of two or more such networks. For example, a network or a portion of a network can include a wireless or cellular network, and the coupling can be a Code Division Multiple Access (CDMA) connection, a Global System for Mobile communications (GSM) connection, or other types of cellular or wireless coupling. In this example, the coupling can implement any of a variety of types of data transfer technology, such as third Generation Partnership Project (3GPP) including 4G, fifth-generation wireless (5G) networks, Universal Mobile Telecommunications System (UMTS), High Speed Packet Access (HSPA), Long Term Evolution (LTE) standard, others defined by various standard-setting organizations, other long-range protocols, or other data transfer technology.

"Non-transitory computer-readable medium" can include, for example, a tangible medium that is capable of storing, encoding, or carrying the instructions for execution by a machine.

"Processor" can include, for example, data processors such as a Central Processing Unit (CPU), a Reduced Instruction Set Computing (RISC) Processor, a Complex Instruction Set Computing (CISC) Processor, a Graphics Processing Unit (GPU), a Digital Signal Processor (DSP), an Application Specific Integrated Circuit (ASIC), a Radio-Frequency Integrated Circuit (RFIC), a Quantum Processing Unit (QPU), a Tensor Processing Unit (TPU), a Neural Processing Unit (NPU), a Field Programmable Gate Array (FPGA), another processor, or any suitable combination thereof. The term "processor" can include multi-core processors that can comprise two or more independent processors (sometimes referred to as "cores") that can execute instructions contemporaneously. These cores can be homogeneous (e.g., all cores are identical, as in multicore CPUs) or heterogeneous (e.g., cores are not identical, as in many modern GPUs and some CPUs). In addition, the term "processor" can also encompass systems with a distributed architecture, where multiple processors are interconnected to perform tasks in a coordinated manner. This includes cluster computing, grid computing, and cloud computing infrastructures. Furthermore, the processor can be embedded in a device to control specific functions of that device, such as in an embedded system, or it can be part of a larger system, such as a server in a data center. The processor can also be virtualized in a software-defined infrastructure, where the processor's functions are emulated in software.

"Signal medium" can include, for example, an intangible medium that is capable of storing, encoding, or carrying the instructions for execution by a machine and includes digital or analog communications signals or other intangible media to facilitate communication of software or data. The term "signal medium" shall be taken to include any form of a modulated data signal, carrier wave, and so forth. The term "modulated data signal" means a signal that has one or more of its characteristics set or changed in such a matter as to encode information in the signal. The terms "transmission medium" and "signal medium" mean the same thing and can be used interchangeably in this disclosure.

"User device" can include, for example, a device accessed, controlled or owned by a user and with which the user interacts perform an action, engagement or interaction on the user device, including an interaction with other users or computer systems.

What is claimed is:

1. A machine-implemented method, comprising:

capturing, using one or more sensors of an Extended Reality (XR) system, tracking data of a first hand and a second hand of a user; and while continuously capturing the tracking data, performing operations comprising:

generating, using the tracking data, a hand-located proprioceptive user interface including an interactive virtual object associated with a location on a surface of the first hand, the hand-located proprioceptive user interface provided to the user outside of an optical element field of view of one or more optical elements of the XR system;

providing the hand-located proprioceptive user interface to the user;

detecting, using the tracking data, a hand touch on the surface of the first hand by a digit of the second hand at the location on the first hand; and performing an action by the XR system based on the interactive virtual object associated with the location on the first hand.

2. The machine-implemented method of claim 1, wherein the surface of the first hand is a palmar surface.

3. The machine-implemented method of claim 2, wherein generating, using the tracking data, the hand-located user interface further comprises:

detecting, using the tracking data, a first being made by the first hand;

detecting, using the tracking data, the first being opened up exposing the palmar surface such that the palmar surface is facing upward; and in response to detecting the first being opened, initiating the generating of the hand-located user interface on the palmar surface of the first hand.

4. The machine-implemented method of claim 1, wherein the surface of the first hand is a hand dorsal surface.

5. The machine-implemented method of claim 4, wherein generating, using the tracking data, the hand-located user interface further comprises:

detecting, using the tracking data, the first hand positioned such that the hand dorsal surface faces upward and one or more fingers of the first hand are extended; and in response to detecting the first hand positioned such that the hand dorsal surface faces upward and one or more fingers of the first hand are extended, initiating the generating of the hand-located user interface on the hand dorsal surface of the first hand.

6. The machine-implemented method of claim 1, wherein the XR system is a head-wearable apparatus.

7. A machine comprising:

at least one processor; and at least one memory storing instructions that, when executed by the at least one processor, cause the machine to perform operations comprising:

capturing, using one or more sensors of an Extended Reality (XR) system, tracking data of a first hand and a second hand of a user; and while continuously capturing the tracking data, performing operations comprising:

generating, using the tracking data, a hand-located proprioceptive user interface including an interactive virtual object associated with a location on a surface of the first hand, the hand-located proprioceptive user interface provided to the user outside of an optical element field of view of one or more optical elements of the XR system;

providing the hand-located proprioceptive user interface to the user;

detecting, using the tracking data, a hand touch on the surface of the first hand by a digit of the second hand at the location on the first hand; and performing an action by the XR system based on the interactive virtual object associated with the location on the first hand.

8. The machine of claim 7, wherein the surface of the first hand is a palmar surface.

9. The machine of claim 8, wherein generating, using the tracking data, the hand-located user interface further comprises:

detecting, using the tracking data, a first being made by the first hand;

detecting, using the tracking data, the first being opened up exposing the palmar surface such that the palmar surface is facing upward; and in response to detecting the first being opened, initiating the generating of the hand-located user interface on the palmar surface of the first hand.

10. The machine of claim 7, wherein the surface of the first hand is a hand dorsal surface.

11. The machine of claim 10, wherein generating, using the tracking data, the hand-located user interface further comprises:

detecting, using the tracking data, the first hand positioned such that the hand dorsal surface faces upward and one or more fingers of the first hand are extended; and in response to detecting the first hand positioned such that the hand dorsal surface faces upward and one or more fingers of the first hand are extended, initiating the generating of the hand-located user interface on the hand dorsal surface of the first hand.

12. The machine of claim 7, wherein the XR system is a head-wearable apparatus.

13. A machine-storage medium, the machine-storage medium including instructions that, when executed by a machine, cause the machine to perform operations comprising:

capturing, using one or more sensors of an Extended Reality (XR) system, tracking data of a first hand and a second hand of a user, and while continuously capturing the tracking data, performing operations comprising:

generating, using the tracking data, a hand-located proprioceptive user interface including an interactive virtual object associated with a location on a surface of the first hand, the hand-located proprioceptive user interface provided to the user outside of an optical element field of view of one or more optical elements of the XR system;

providing the hand-located proprioceptive user interface to the user;

detecting, using the tracking data, a hand touch on the surface of the first hand by a digit of the second hand at the location on the first hand; and performing an action by the XR system based on the interactive virtual object associated with the location on the first hand.

14. The machine-storage medium of claim 13, wherein the surface of the first hand is a palmar surface.

15. The machine-storage medium of claim 14, wherein generating, using the tracking data, the hand-located user interface further comprises: detecting, using the tracking data, a first being made by the first hand;

detecting, using the tracking data, the first being opened up exposing the palmar surface such that the palmar surface is facing upward; and in response to detecting the first being opened, initiating the generating of the hand-located user interface on the palmar surface of the first hand.

16. The machine-storage medium of claim 13, wherein the surface of the first hand is a hand dorsal surface.

17. The machine-storage medium of claim 16, wherein generating, using the tracking data, the hand-located user interface further comprises:

detecting, using the tracking data, the first hand positioned such that the hand dorsal surface faces upward and one or more fingers of the first hand are extended; and in response to detecting the first hand positioned such that the hand dorsal surface faces upward and one or more fingers of the first hand are extended, initiating the generating of the hand-located user interface on the hand dorsal surface of the first hand.

18. The machine-storage medium of claim 13, wherein the XR system is a head-wearable apparatus.

* * * * *